United States Patent
Oldford et al.

(10) Patent No.: US 6,827,197 B2
(45) Date of Patent: Dec. 7, 2004

(54) FLEXIBLE AUTOMOTIVE ASSEMBLY LINE AND METHOD

(75) Inventors: Keith A. Oldford, Howell, MI (US); Michael R. Dugas, Brighton, MI (US); Velibor Kilibarda, Birmingham, MI (US); Alan S. Kaufman, White Lake, MI (US); Karl G. Johnson, New Hudson, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 0 days.

(21) Appl. No.: 10/402,901

(22) Filed: Mar. 28, 2003

(65) Prior Publication Data

US 2003/0188952 A1 Oct. 9, 2003

Related U.S. Application Data

(62) Division of application No. 09/767,931, filed on Jan. 23, 2001, now Pat. No. 6,554,119
(60) Provisional application No. 60/180,607, filed on Feb. 7, 2000.

(51) Int. Cl.[7] .............................................. B65G 37/00
(52) U.S. Cl. .................................. 198/346.3; 198/345.2
(58) Field of Search ........................... 198/345.2, 346.3, 198/465.4, 343.2

(56) References Cited

U.S. PATENT DOCUMENTS

| | | |
|---|---|---|
| 2,779,092 A | 1/1957 | Gordon |
| 2,854,159 A | 9/1958 | Abbey |
| 3,335,839 A | 8/1967 | Neumann |
| 3,439,813 A | 4/1969 | Drumm et al. |
| 3,968,558 A | 7/1976 | Sekine et al. |
| 4,305,495 A * | 12/1981 | Zinke et al. ............. 198/346.3 |
| 4,670,961 A | 6/1987 | Fontaine et al. ............... 29/429 |
| 4,720,231 A | 1/1988 | Pienta ......................... 414/560 |
| 4,723,356 A | 2/1988 | Sakamoto et al. ............. 29/714 |
| 4,734,979 A | 4/1988 | Sakamoto et al. ............. 29/822 |
| 4,772,374 A * | 9/1988 | Urquhart et al. ......... 198/346.3 |
| 4,797,989 A | 1/1989 | Cherko |
| 4,894,909 A | 1/1990 | Sakamoto et al. |
| 4,924,996 A | 5/1990 | Svensson et al. ........... 198/341 |
| 4,928,386 A | 5/1990 | Schupp et al. ................ 29/824 |
| 4,928,806 A | 5/1990 | Anderson et al. |
| 4,937,929 A | 7/1990 | Nokajima et al. ............ 29/430 |
| 4,964,497 A | 10/1990 | Bundo et al. ................ 198/341 |
| 5,027,502 A | 7/1991 | Sakamoto et al. |
| 5,123,161 A | 6/1992 | Kubo et al. |
| 5,177,862 A | 1/1993 | Speece ......................... 29/824 |

(List continued on next page.)

FOREIGN PATENT DOCUMENTS

| | | | | |
|---|---|---|---|---|
| JP | 362279178 A | 12/1987 | .................. | 29/700 |
| JP | 406206582 A | 7/1994 | .................. | 29/823 |

*Primary Examiner*—James R. Bidwell
(74) *Attorney, Agent, or Firm*—Young & Basile, P.C.

(57) ABSTRACT

An apparatus for assembling an automotive body on an assembly line having a right-hand body subassembly line, a left-hand body subassembly line and an underbody subassembly line, for delivery to a pallet transport system for movement through a body framing subassembly line. The apparatus includes an overhead transport system for transporting automotive components along at least one of the subassembly lines and for conveying the automotive components along a pallet transport system on the body framing subassembly line. The overhead transport system includes a trolley movable along a single overhead rail, a carriage slidably movable relative to the trolley, and a plurality of antler nests. Each antler nest is individually engageable with the carriage. The apparatus also includes a lowerator for transferring components from the overhead transport system to a geometry fixture at a workstation along the subassembly line. The workstation along the subassembly line can include a plurality of geometry fixtures that are exchangeable at a ready position of the workstation.

20 Claims, 30 Drawing Sheets

U.S. PATENT DOCUMENTS

| | | |
|---|---|---|
| 5,186,304 A | 2/1993 | Kaczmarek et al. |
| 5,191,958 A | 3/1993 | Tolocko |
| 5,251,739 A | 10/1993 | Tolocko |
| 5,472,503 A | 12/1995 | Birchler |
| 5,479,698 A | 1/1996 | Angel .................. 29/701 |
| 5,699,891 A | 12/1997 | Gosdowski et al. |
| 5,943,768 A | 8/1999 | Ray .................. 29/822 |
| 5,996,771 A | 12/1999 | Estes |
| RE36,541 E | 2/2000 | Rossi .................. 228/6.1 |
| 6,061,887 A | 5/2000 | Kawasaki et al. |
| 6,109,424 A | 8/2000 | Doan .................. 198/468.8 |
| 6,145,180 A | 11/2000 | Kogai et al. .................. 29/429 |
| 6,286,661 B1 | 9/2001 | Galassi et al. |
| 6,339,874 B2 | 1/2002 | Segawa et al. .................. 29/824 |
| 6,409,438 B1 | 6/2002 | Kohler |

\* cited by examiner

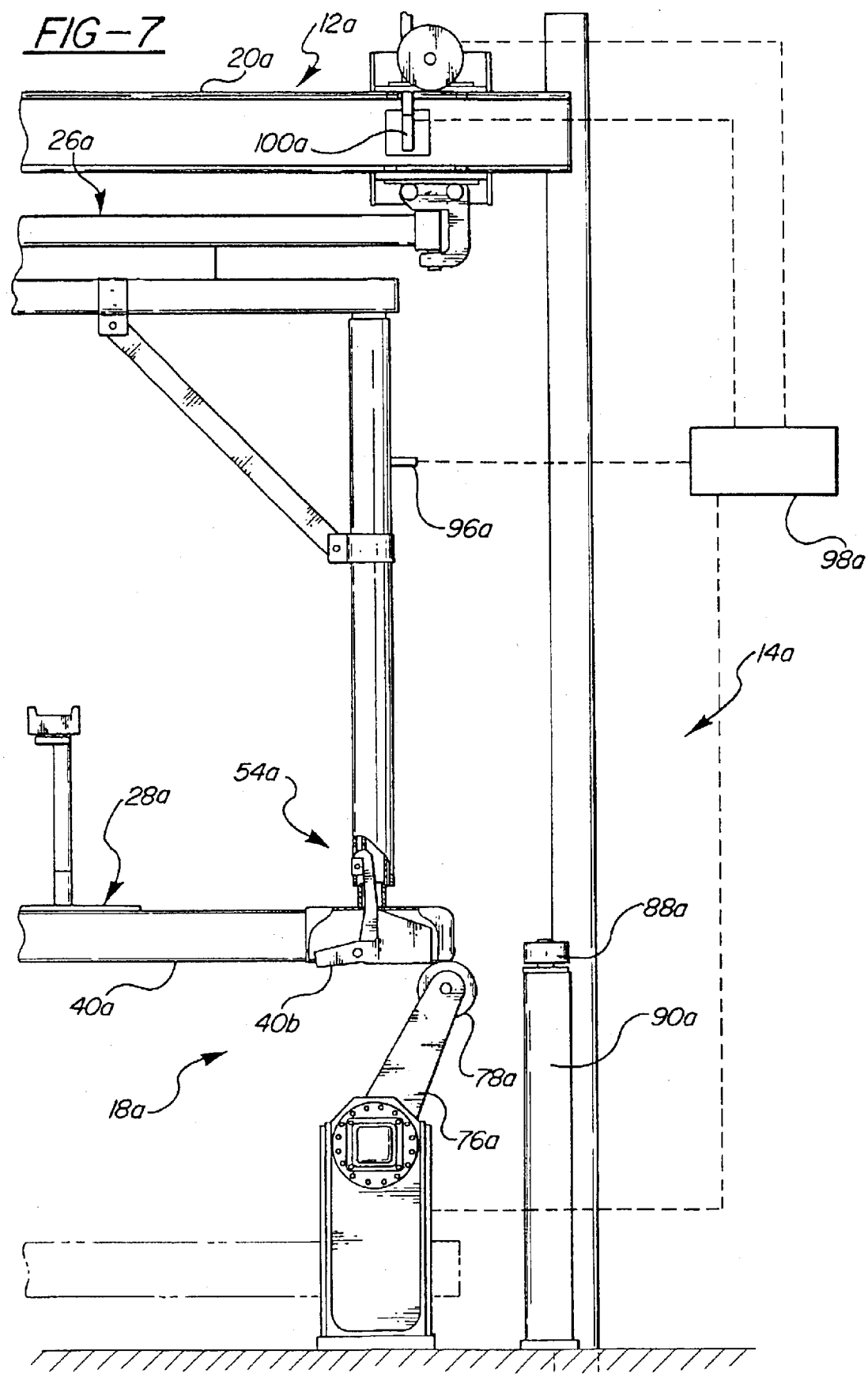

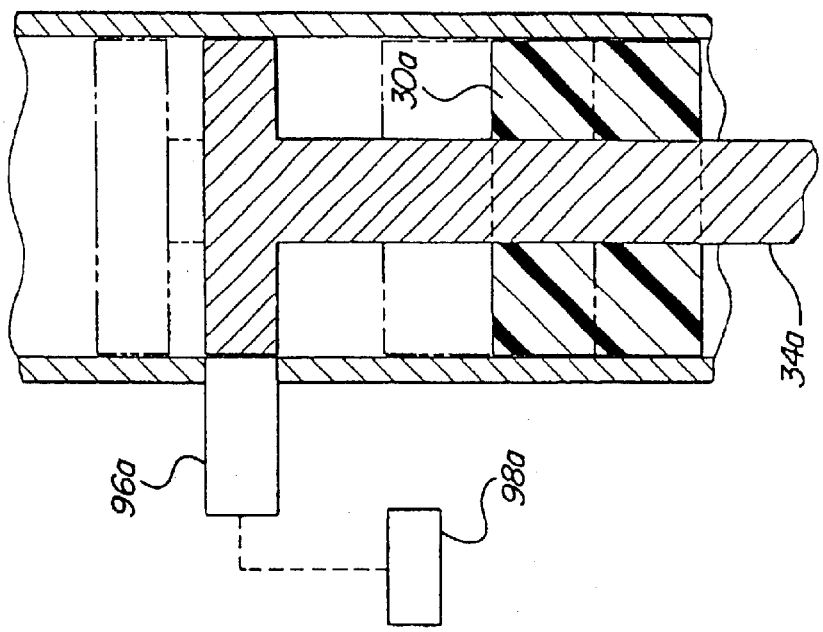
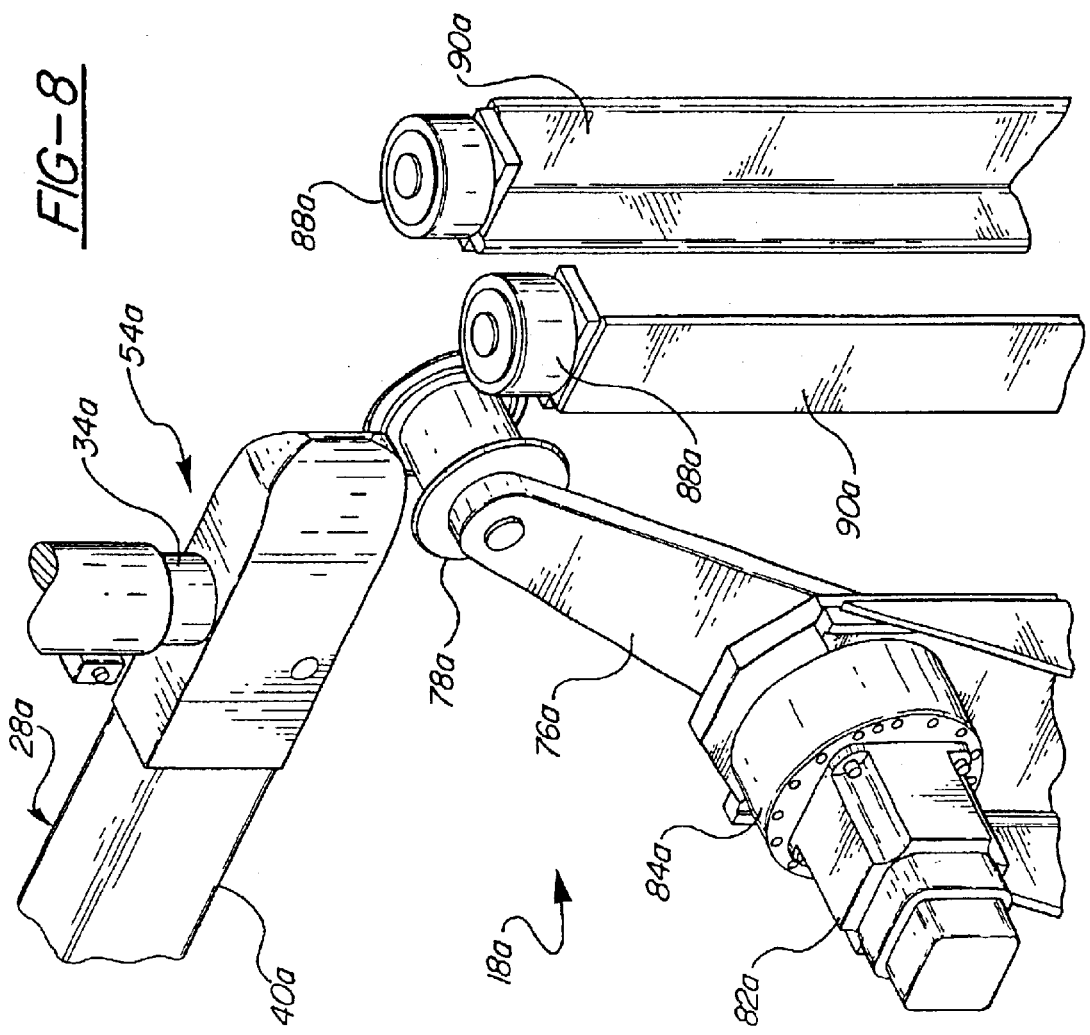

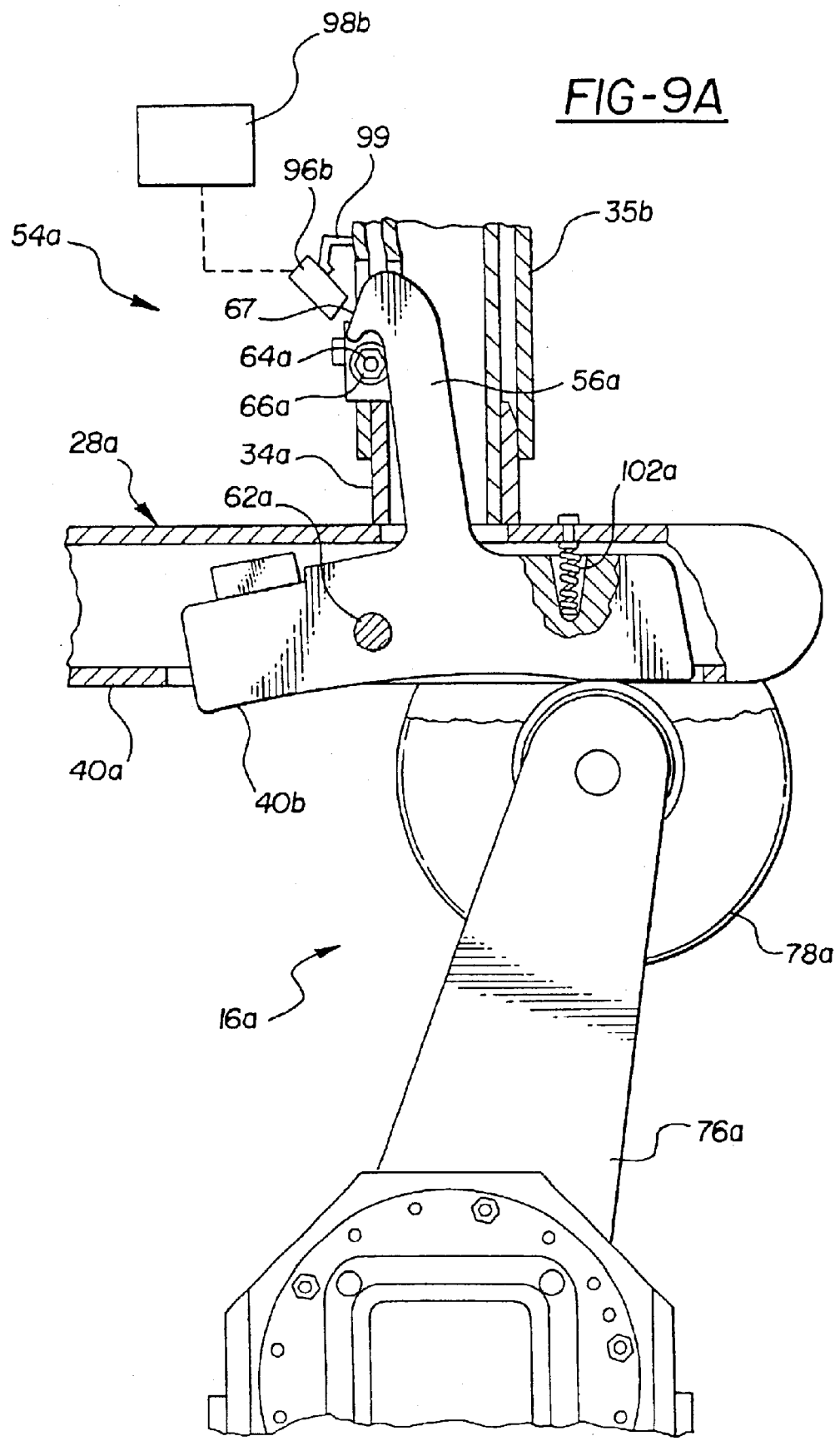

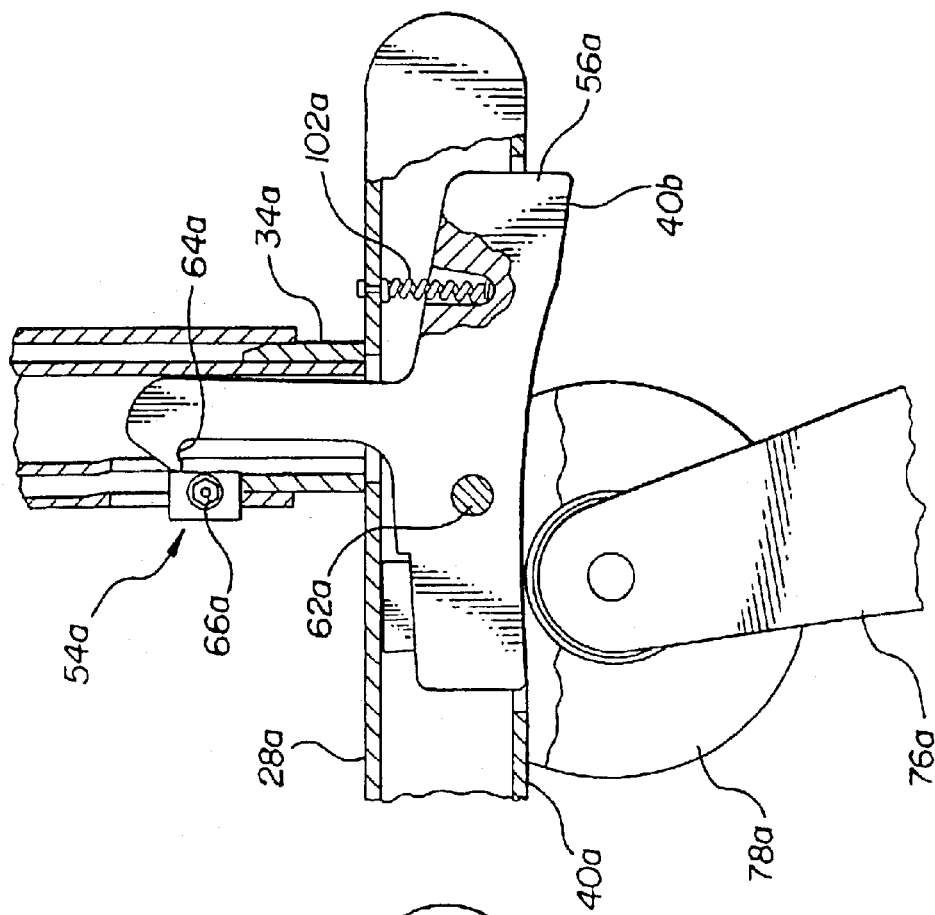
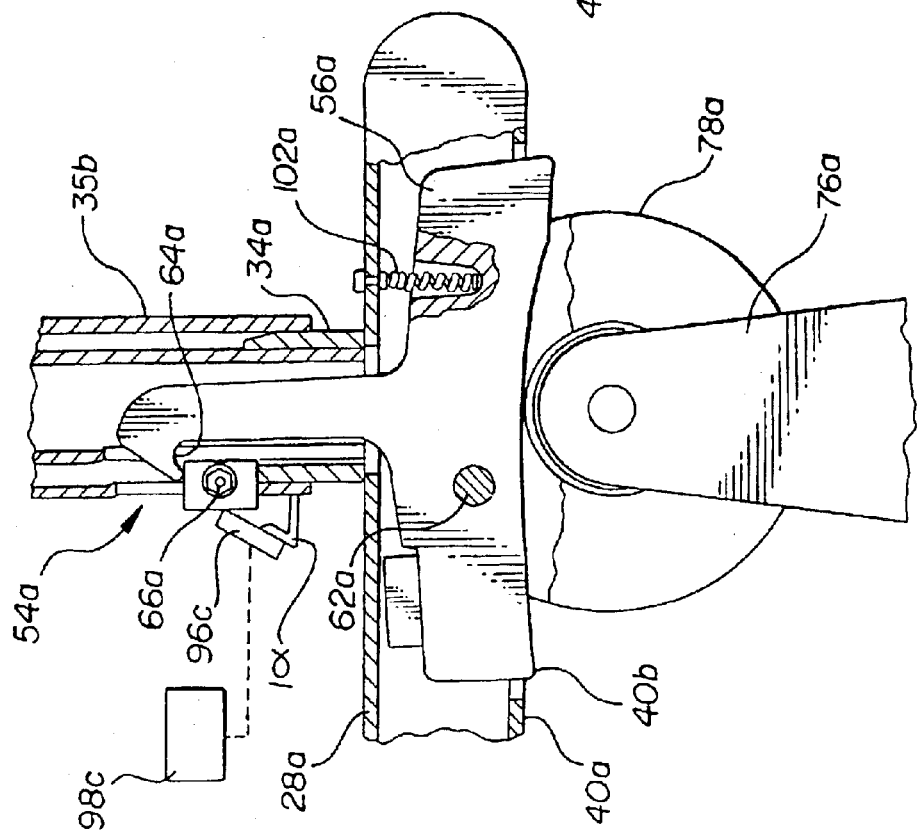

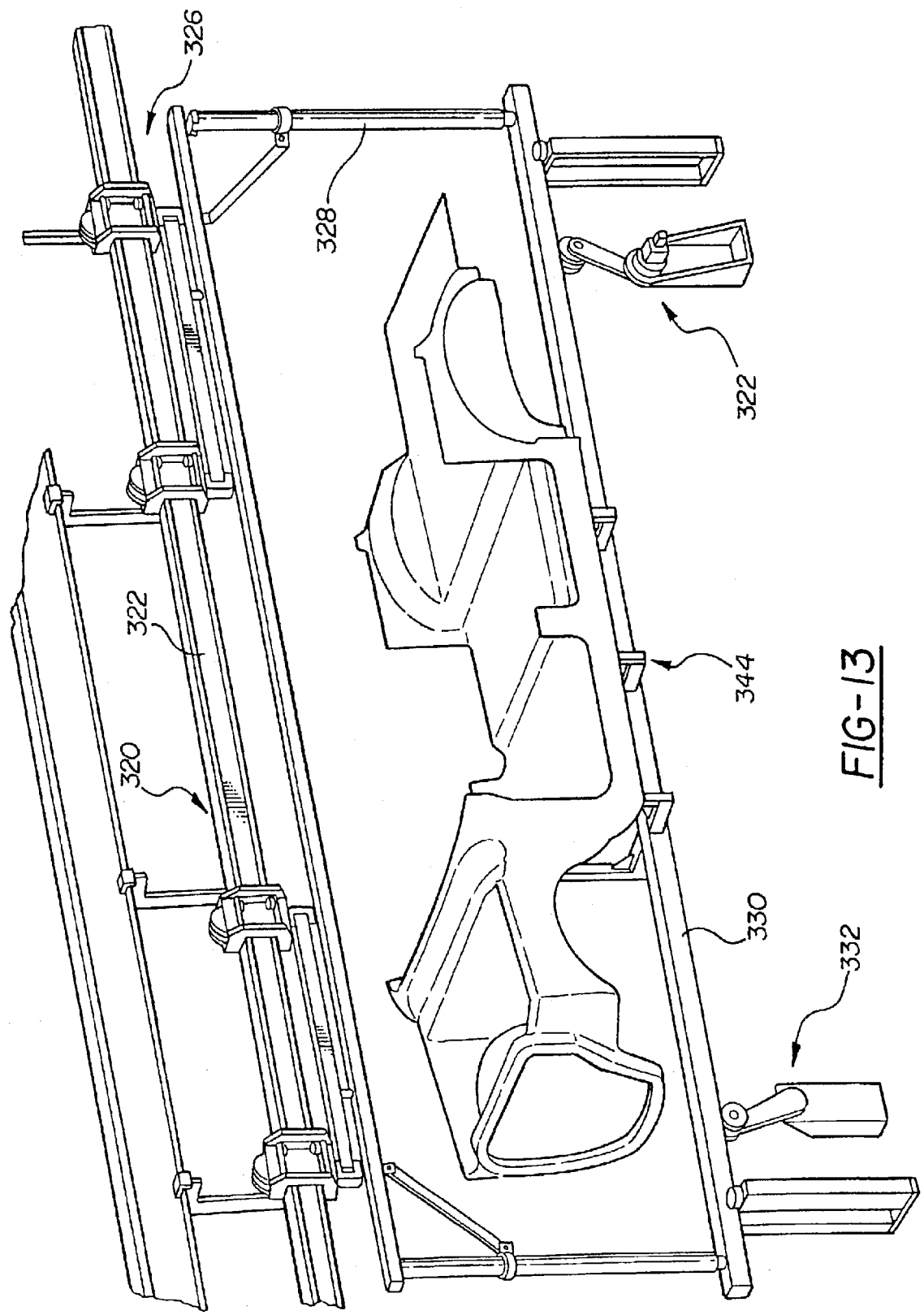

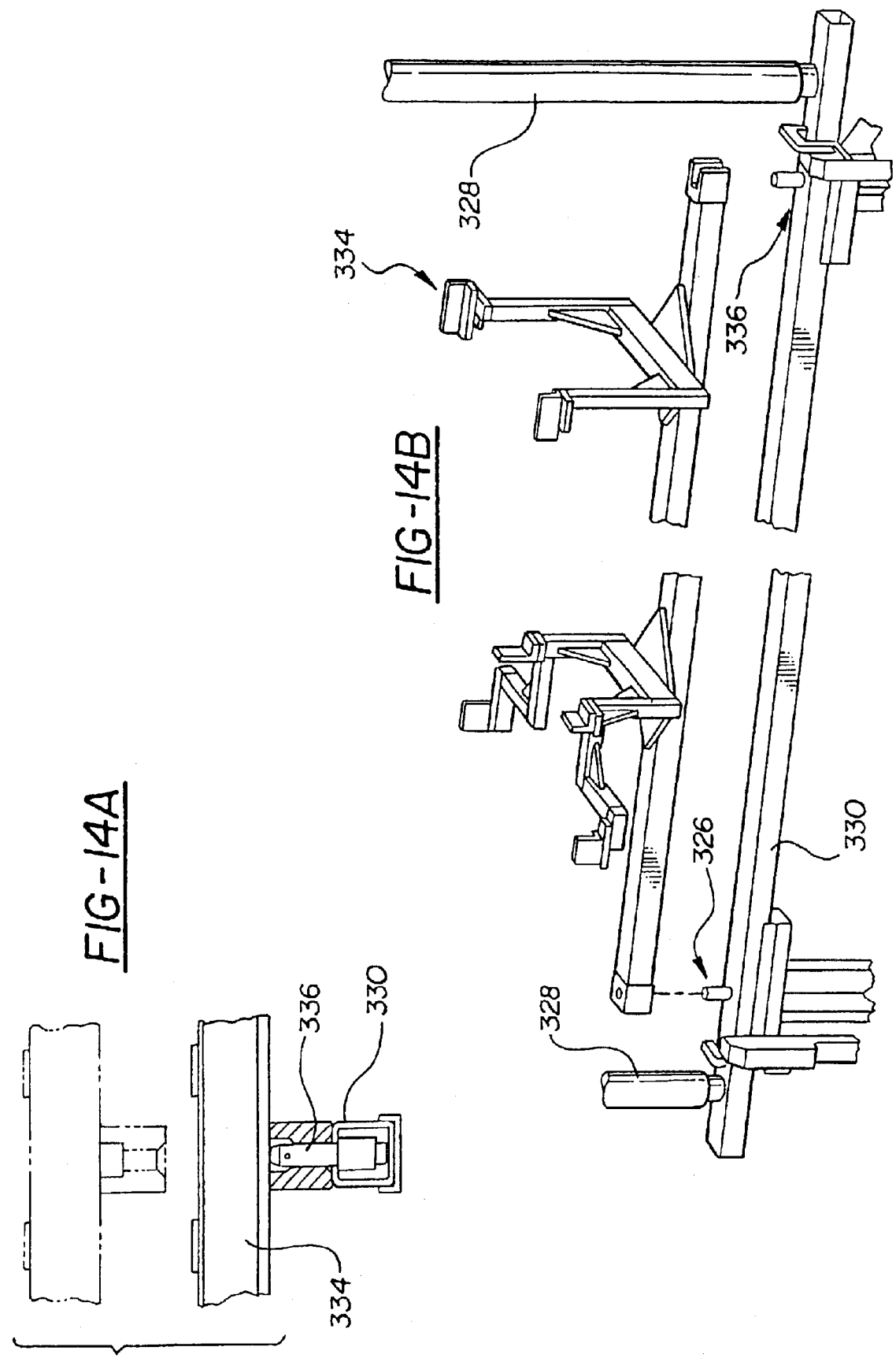

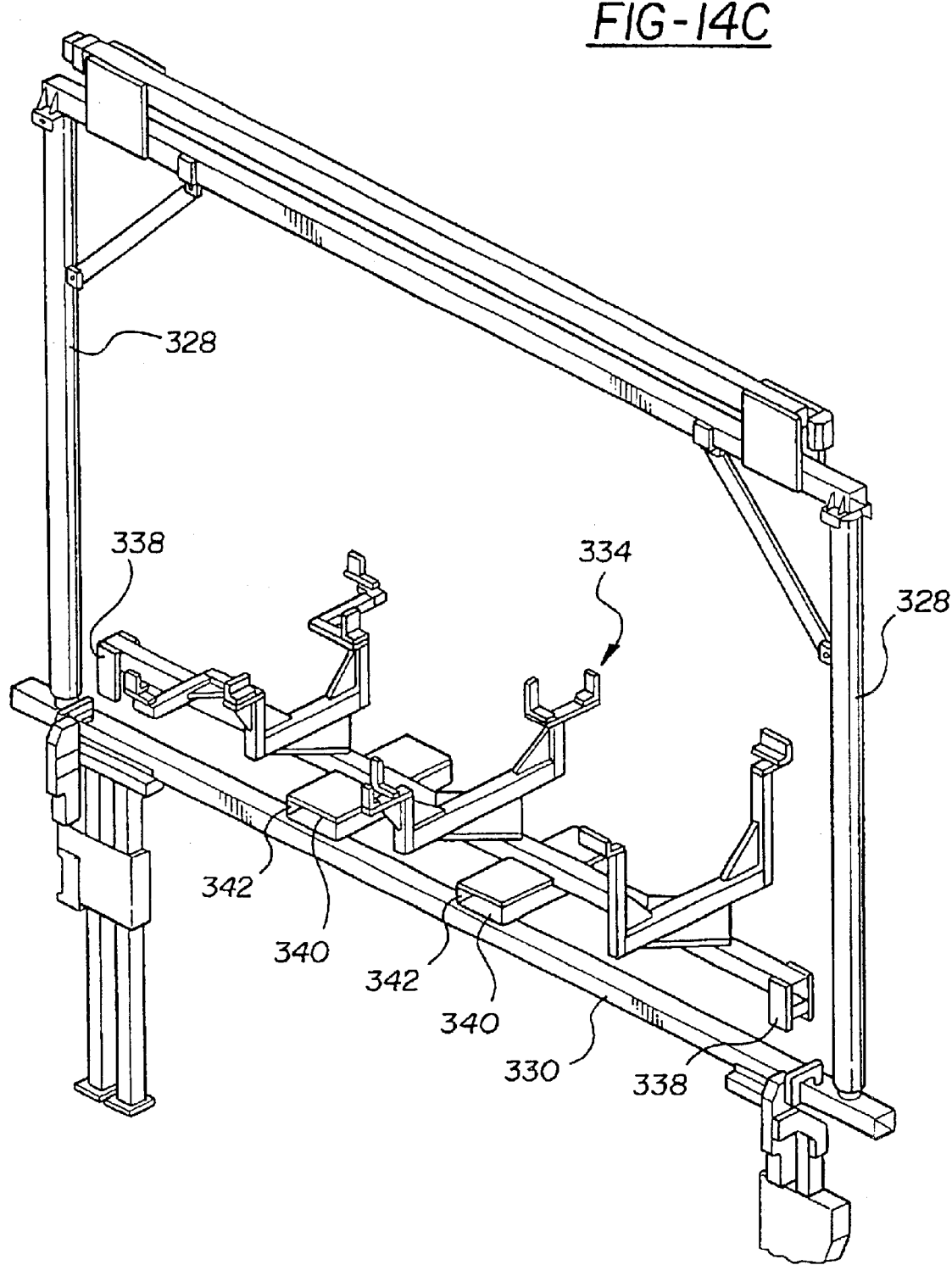

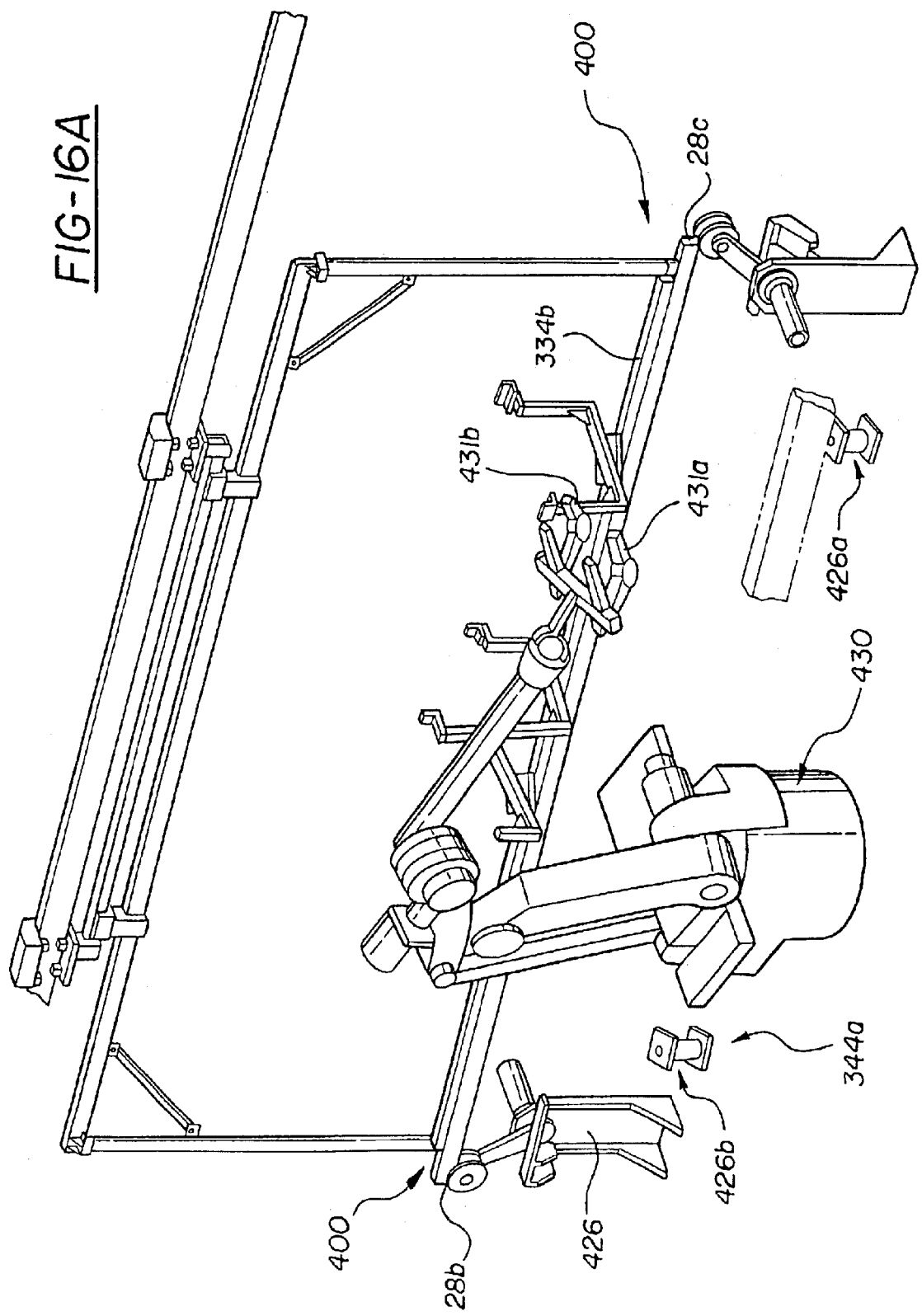

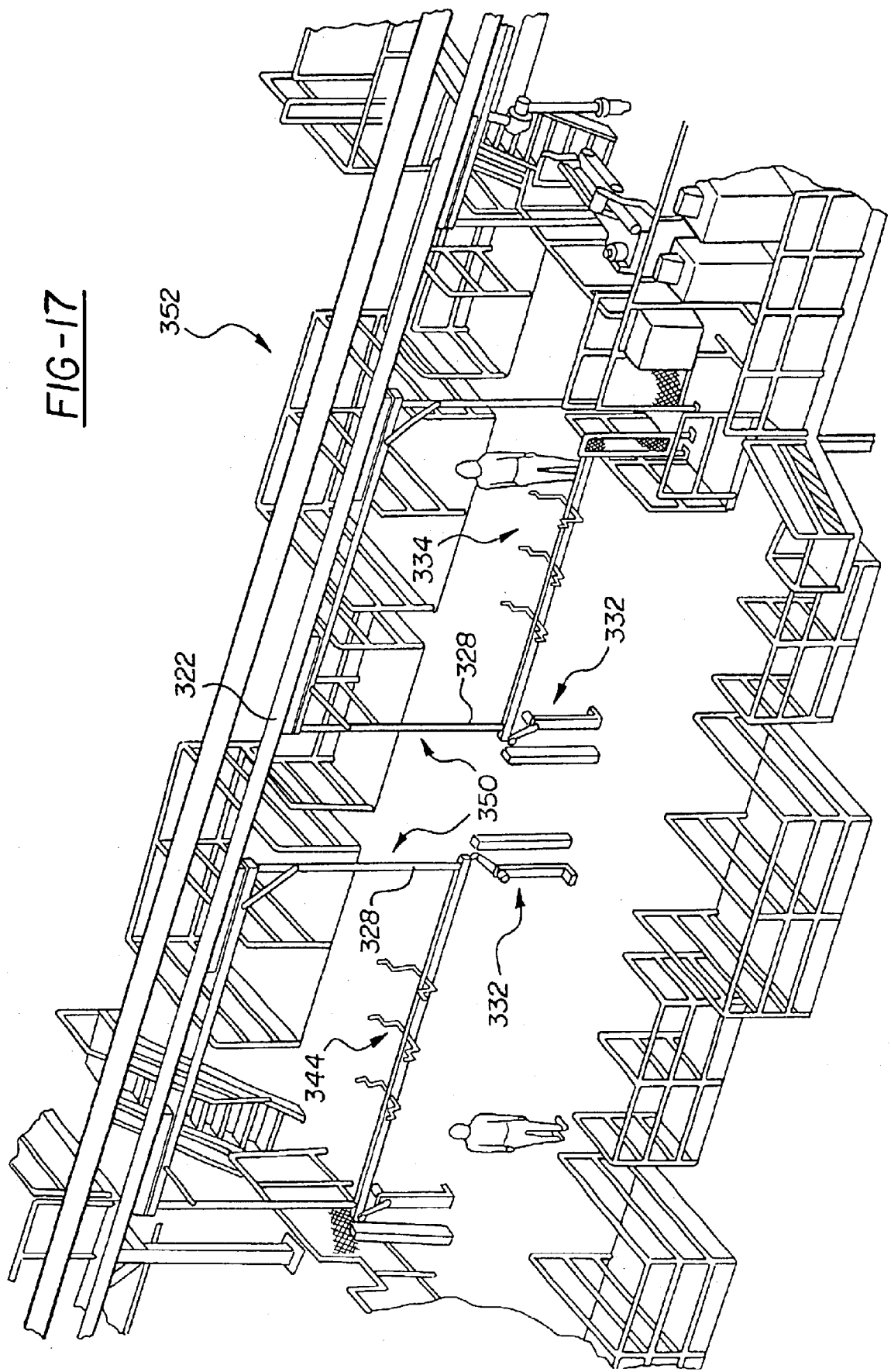

FLEXIBLE AUTOMOTIVE ASSEMBLY LINE AND METHOD

CROSS-REFERENCE TO RELATED APPLICATIONS

This application is a divisional application of U.S. Utility application Ser. No. 09/767,931, filed Jan. 23, 2001, now U.S. Pat. No. 6,554,119 for a FLEXIBLE AUTOMOTIVE ASSEMBLY LINE AND METHOD, which was a continuation of U.S. Provisional Patent Application Ser. No. 60/180,607, filed Feb. 7, 2000, for a METHOD AND APPARATUS FOR FLEXIBLE BODY ASSEMBLY. U.S. Utility application Ser. No. 09/767,931 for a FLEXIBLE AUTOMOTIVE ASSEMBLY LINE AND METHOD was filed contemporaneously with two other applications, U.S. Utility application Ser. No. 09/767,929, for a INTERCHANGEABLE NESTS FOR SUPPORTING COMPONENTS ON A TRANSPORT SYSTEM, and U.S. Utility application Ser. No. 09/768,090, for a FLEXIBLE AUTOMOTIVE ASSEMBLY WORKSTATION AND METHOD.

FIELD OF THE INVENTION

The present invention relates to a method and apparatus for the flexible assembly of a plurality of automotive body styles on a single assembly line with zero loss of production during changeover.

BACKGROUND OF THE INVENTION

Current body assembly lines typically use a palletized approach for assembling components of the automotive body style to be built and for joining those components to one another at a framing station. The palletized approach requires that sufficient pallets be provided for each type of body style to be assembled and transported along the assembly line at one time, including spares for any pallets that may be damaged during the assembly process. When this number is multiplied by the number of models to be produced on the assembly line, the number of pallets can be a very large number requiring large amounts of off line storage space and also requiring a tremendous amount of maintenance to maintain the accurate geometry required of a palletized fixture.

SUMMARY OF THE INVENTION

It would be desirable to reduce the number of pallets required for a modern automotive assembly line capable of producing a plurality of automotive body styles on the same line without any loss of production during changeover. It would be desirable in the present invention to provide an assembly line configuration capable of building a single automotive body style, two automotive body styles, three automotive body styles, or four automotive body styles without loss of production, and without requiring excessive changes in the production line configuration. It would be desirable in the present invention to provide an overhead component delivery system for the early stages of the assembly line, while providing a palletized transportation system between the workstation beginning at the underbody respot station. It would be desirable to provide an overhead transport system for the component assembly line which is capable of quick and efficient changeover of body style fixtures to produce different body styles without interruption of production. It would be desirable to provide a flexible assembly workstation having an interchangeable workpiece support or geometry fixture for the different body styles to be manufactured through the workstation, where the different support fixtures can be interchanged with one another without loss of production.

A flexible automotive body assembly line according to the present invention includes an overhead component transport system. The overhead transport system preferably is provided for the bodyside left hand assembly line, bodyside right hand assembly line, and underbody assembly line and tack workstation. After the underbody is tacked at the underbody tack workstation, the underbody is transported by an overhead transport system and transferred to a palletized system at the underbody respot workstation. After respot, the pallet system transfers the underbody to the framing workstation, where the bodyside left and right hand components are delivered by the overhead system. The framing workstation positions the left hand and right hand components of the bodysides to the underbody and tacks the right and left components with respect to the underbody. The pallet then transfers the assembled workpiece to the roof framing fixture and continues through the framing respot workstation where additional welding and tacking is performed. The pallet system then transfers the assembled framed body to closure workstations where closure panels can be assembled prior to delivering the assembled body to the paint station.

Preferably, the overhead delivery system for the bodyside left hand assembly line, the bodyside right hand assembly line, and the underbody tack workstation is an electric monorail system. The electric monorail system can provide an overhead rail extending between the various workstations, and preferably extends in a circular or loop configuration passing through the workstations and through a workpiece support or antler exchange workstation for preparing the overhead delivery system to receive and transport different body styles or models through the assembly line without any loss of production. The electric monorail system can include a carriage powered by an electric motor for movement between the workstations along the overhead monorail. Downwardly extending supports or pillars extend from the carriage for receiving the workpiece support or antlers there between. The workpiece supports or antlers are interchangeable as required for engaging the particular body style or model of components to be manufactured through the assembly line. The vertically extending supports or pillars include a telescoping function to allow the workpiece support or antlers to be moved from a vertically raised position used to transport the workpiece or components between workstations, and a vertically lowered position at a workstation to deliver the workpiece or a component to the workpiece support, nest or geometry fixture at the particular workstation. The vertically extending supports or pillars also include latching mechanisms to hold the workpiece support or antlers in the raised position during transport between workstations. Preferably, the drive for unlatching and lowering the workpiece support or antlers and supported workpiece or component is provided at each workstation, and includes a single drive for each vertically extending support or pillar of the electric monorail carriage system. Preferably, the single drive for each vertically extending support or pillar of the carriage located at the workstation is capable of unlatching the latch mechanism prior to lowering the workpiece support or antlers at the workstation location, and after the work has been performed at that workstation raising the work support or antler portion of the carriage to the raised position and latching the latch mechanism of the vertically extending support or pillars from the carriage prior to the carriage leaving the workstation.

The present invention also includes a flexible body assembly workstation. For purposes of illustration, a single workstation will be described. The flexible body assembly workstation can be used at the bodyside left hand assembly location, the bodyside right hand assembly location, the underbody tack assembly workstation, or any other major subassembly component. The workstation preferably includes an overhead component delivery system extending through the workstation. The overhead delivery system can enter the workstation empty, or can deliver a partially completed component to the workstation for additional assembly steps. In either case, a workpiece support or geometry fixture is provided at the flexible body assembly workstation for receiving the parts to be built up into the component to be transported, or to be added to the partially completed component delivered by the overhead system. The workpiece support or geometry fixture at each flexible body assembly workstation is interchangeable to match the body style or model to be manufactured at the workstation for that particular operation cycle. Preferably, the flexible assembly workstation includes sufficient capacity to handle up to four different workpiece support or geometry fixtures for use on demand at the workstation depending on the particular body style or model to be manufactured at the workstation. In one configuration, the workpiece supports or geometry fixtures are connected to a delivery system capable of moving the fixtures between the standby or storage positions and a ready position for receiving the workpiece component to be delivered to the workstation. In the alternative, a workpiece support or geometry fixture can be delivered using an "H-Gate" configuration. The H-Gate delivery system uses a linear transfer system, such as a rail delivery to the workstation ready position and between two standby or storage positions on either side of the station. The standby positions are serviced by two transversely extending delivery systems. One delivery system is provided on each side of the workstation producing the "H" configuration for which the system is named. The transversely extending delivery systems provide, or pre-load, the next workstation support or geometry fixture required at the workstation. For changeover, the current workpiece support or geometry fixture and the new workpiece support or geometry fixture are reciprocated simultaneously along the rail system bringing the new workstation support or geometry fixture into the workstation and removing the previously used workpiece support or geometry fixture from the workstation. When properly located, the rail transfer system stops in the appropriate position for the geometry fixture to be positioned at the workstation. The old workpiece support or geometry fixture is then removed from the standby position by one of the transversely extending delivery systems. The process is then repeated by pre-positioning the next desired geometry fixture at one of the standby positions for subsequent delivery to the workstation on demand.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 7 is a side elevational view of the preferred embodiment of a lowerator according to the present invention;

FIG. 8 is a detailed perspective view of the preferred embodiment of the lowerator according to the present invention;

FIGS. 9A–9C are detailed cross-sectional illustrations of the latch mechanism and actuator of the preferred embodiment of the lowerator according to the present invention;

FIG. 10 is a simplified schematic diagram of a vertical position sensor according to the present invention;

FIG. 13 is a perspective view of a lowerator for transporting the underbody to and from the underbody tack workstation;

FIGS. 14A–14E are perspective views of various embodiments of an overhead delivery system with interchangeable workpiece supports or antler configurations for different body styles or models;

FIG. 16A is a perspective view of a robot for exchanging an antler nest with respect to a carrier;

FIG. 17 is a perspective view of loading stations, either manual or automated, positioned between two flexible body assembly workstations;

DESCRIPTION OF THE PREFERRED EMBODIMENT

Figure 1:
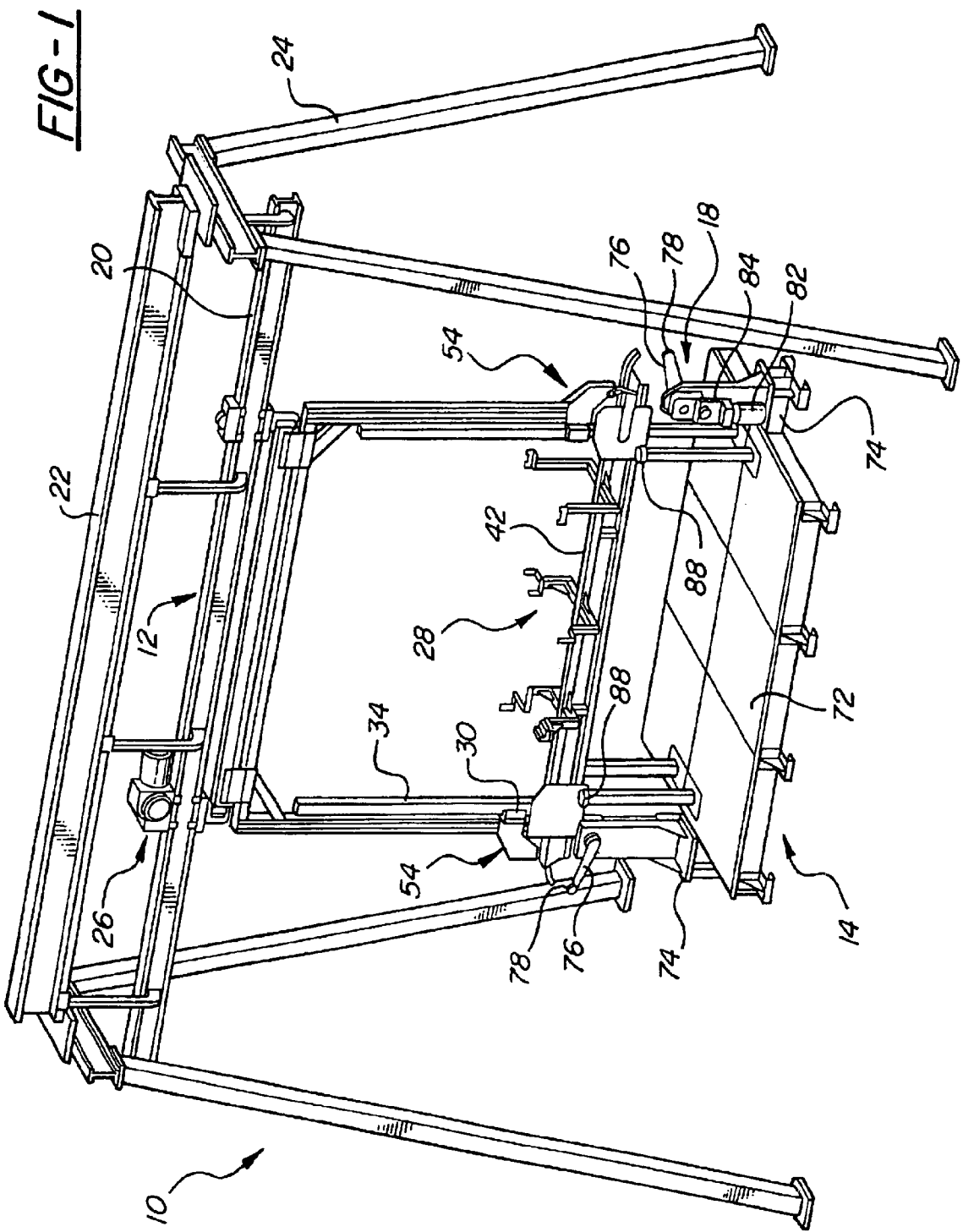
FIG. 1 is a perspective view of the present invention, shown in an exemplary operational environment.

Referring now to FIG. 1, the present invention generally includes workpiece conveyance means 10 for transporting a workpiece along path means 12 for defining a path of travel between workstations 14 positioned along the path means, and locator means positioned at the workstation and operative for locating the workpiece at the workstation. A lowerator 18 is provided for moving the workpiece between the conveyance means 10 and the locator means. For purposes of illustration, the lowerator 18 is shown in combination with an assembly system including the path means 12 and workstations 14. The conveyance means 10 transports workpieces between the workstations 14, where one or more specific processing operations are performed on the workpieces. For instance, the assembly system can be in the form of an automotive production line where workpieces, such as automotive body panels and frame components, are progressively assembled at the workstations 14 along the path 12 of travel. While a particular operational environment is illustrated herein, it is not intended to be limiting with respect to the present invention, which will have numerous applications as understood by those of skill in the art.

More particularly, the path means 12 can include at least one rail 20, such as an overhead monorail, suspended from a support structure such as a coextensive horizontal spine 22 and intermittently spaced vertical supports 24. The workpiece conveyance means 10 includes driving means in the form of a motor-driven trolley 26 operative to move the conveyance means 10 along the rail 20 in known fashion. As with other aspects of the depicted operational environment, the illustrated driving means are not intended to be limiting with respect to the present invention, and any desired driving means can be adopted to serve the purpose of moving the conveyance means 10 along the selected path means 12 in the desired operational environment.

Figure 2:
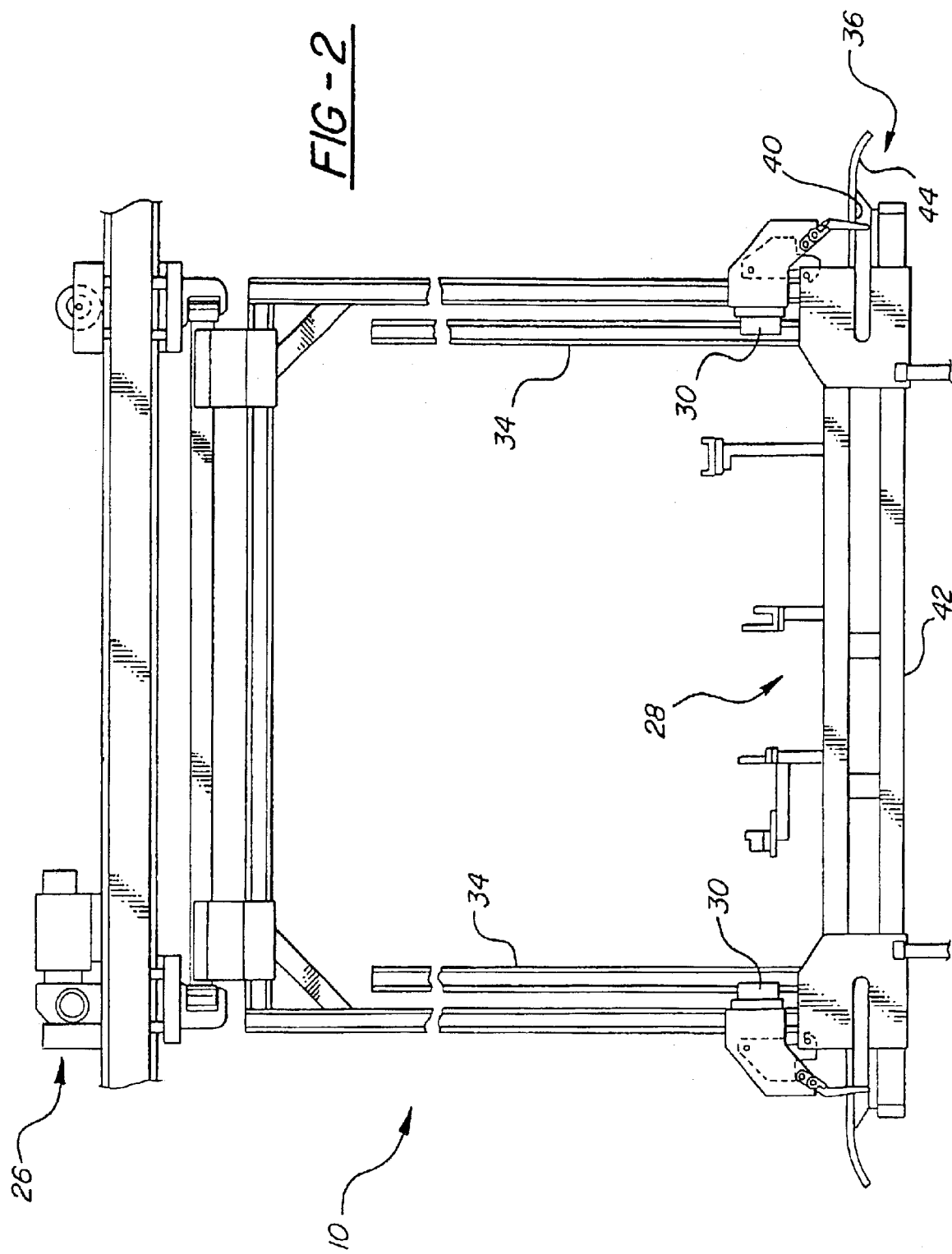
FIG. 2 is a lateral elevational view of the present invention, shown in an exemplary operational environment.
Figure 3:
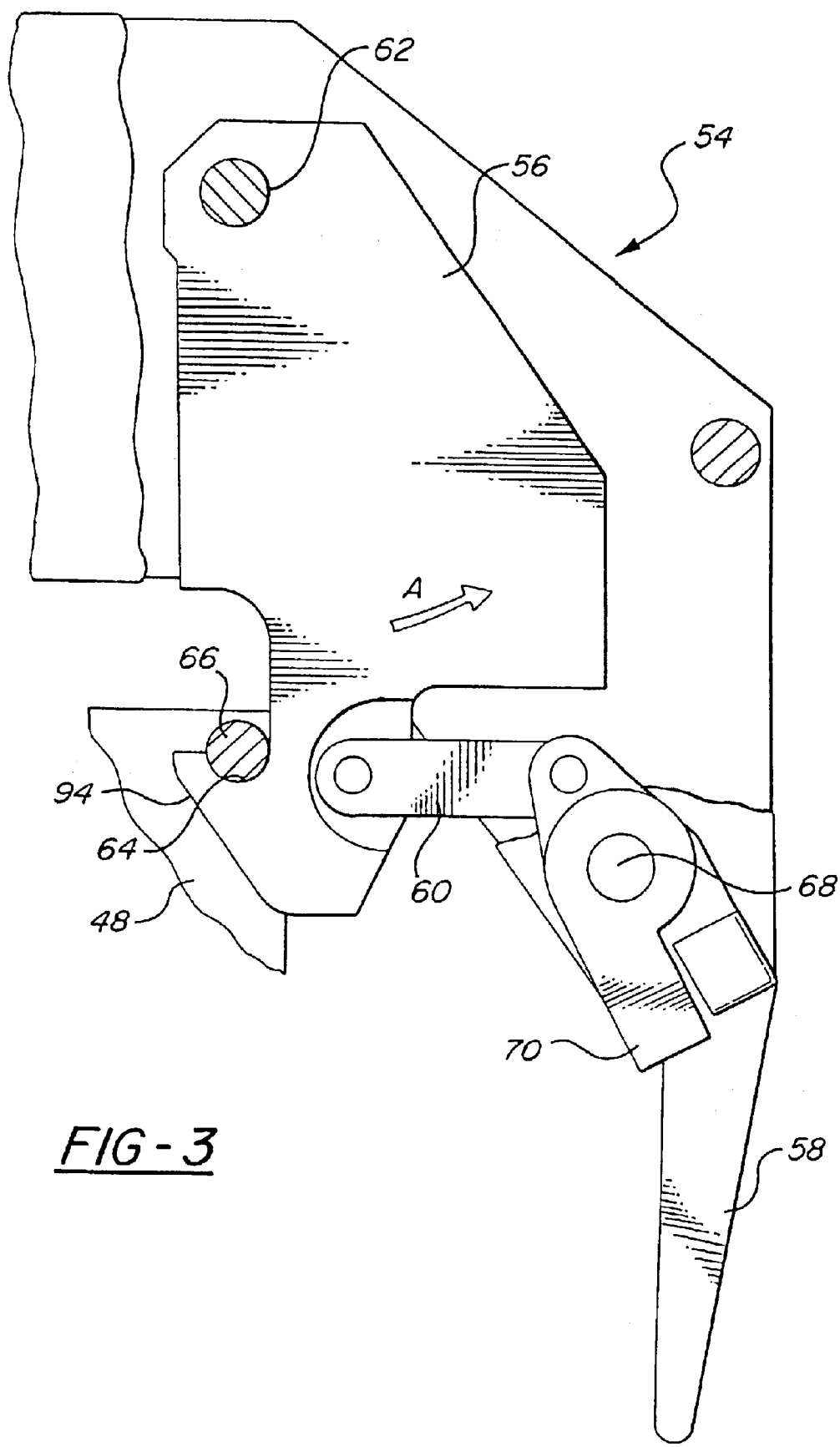
FIG. 3 is an end elevational view depicting the lowerator mechanism of the present invention.

Referring now to FIGS. 2 and 3, the workpiece conveyance means 10 generally includes both the trolley 26 and a carrier 28. The trolley 26 is configured generally in an inverted "U" shape, with horizontal and vertical members. The horizontal member is fixed to a parallel-disposed support cross-piece providing a point of attachment for trolley 26 or other driving means as appropriate. The trolley 26 is thus immovably associated with the driving means and moves along the path means 12 in conjunction therewith. The carrier 28 is also generally in a "U" shape, including a horizontal member and a vertical member. Workpiece carrying means, such as carrier 28, in the form of a workpiece nest can include a plurality of projecting fingers or antlers disposed on a horizontal element of the carrier 28 to support the workpiece being conveyed. The configuration of the workpiece nest can take any form desired and appropriate for the workpiece to be conveyed and the work to be performed thereon. Each of the trolley 26 and carrier 28 may include lengths of metal plates, beams, brackets, or tubing joined by welding, joining plates, or other known means, though other suitably strong materials can be substituted.

Figure 4:
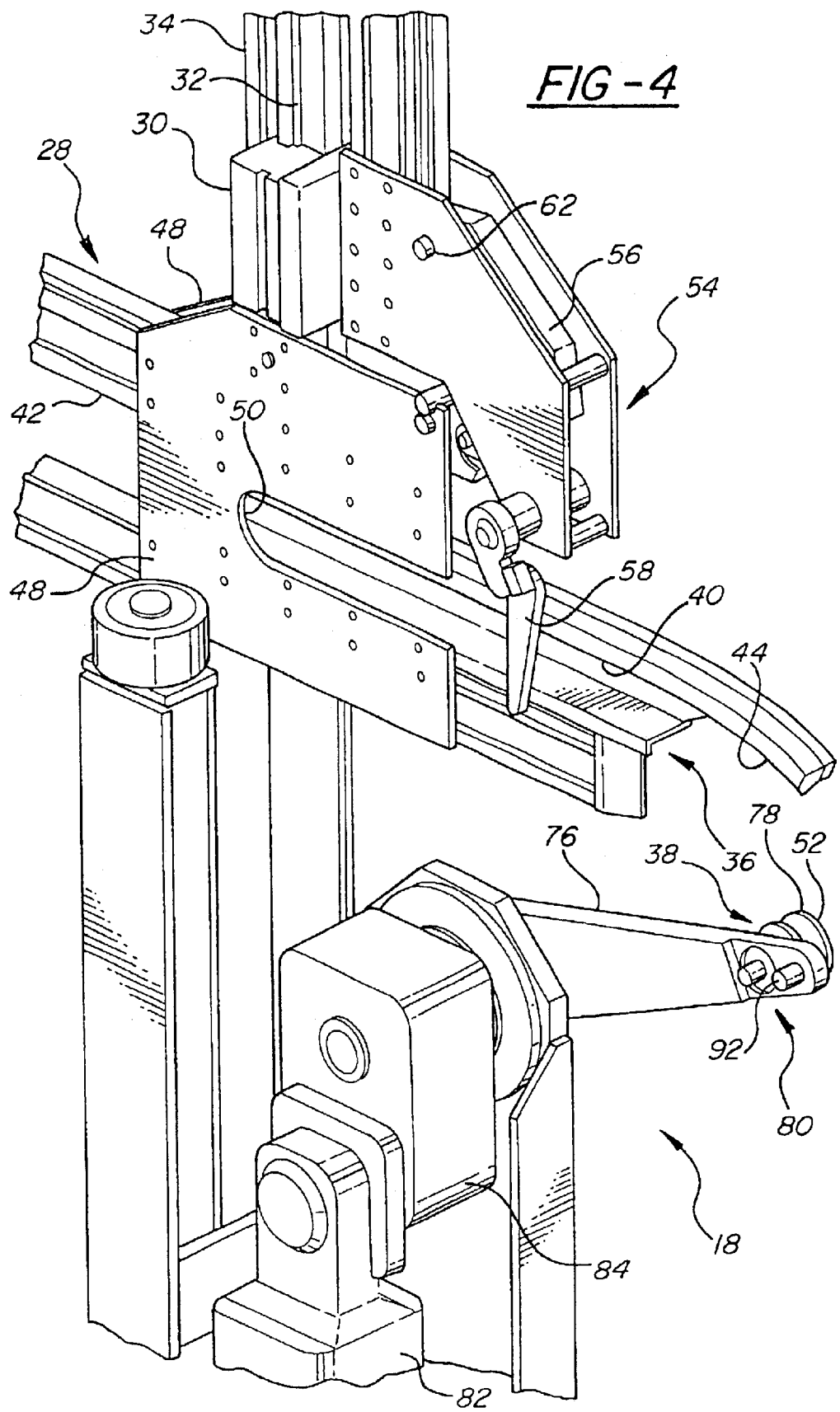
FIG. 4 is a detailed cross-sectional view of the latch means of the present invention.

As indicated, the carrier 28 is slidingly associated with trolley 26 so as to be moveable vertically in relation to the trolley 26 in order to lower a workpiece into the workstation 14 without the necessity of lowering the entire conveyance means 10 and a section of the rail means 20, as with some prior known mechanisms. Bearing blocks 30 are provided, one associated with each of the vertical members, the bearing blocks being dimensioned to slidingly receive the vertical elements 34 of the carrier 28 therein. Referring now to FIG. 4, bearing surfaces 32 are provided along the length of vertical elements 34 to define a travel surface for sliding movement of the carrier 28.

Means 36 are provided associated with the carrier 28 for receiving the positioning means 38. Referring now to FIGS. 2 and 4, receiving means 36 can include a cam surface 40, such as a channel or slot, preferably provided at both ends of the horizontal member 42 of the carrier 28. Cam surface 40 is fashioned from metal or other suitably strong material. The cam surface 40 illustrated in FIGS. 1–2 and 4–6C includes an outer travel surface extending beyond the channel opening to define a radiused portion 44. The cam surface 40 is fixed between plates 48 connected to the horizontal member 42 of the carrier 28. The plates 48 include cut-out portions 50, leaving a sufficient length of each cam surface 40 unobstructed for movement of the positioning means 38 there along. The cam surface 40 opens outwardly away from each end of the carrier 28. The cam surface 40 is dimensioned to receive therein a lifter roller 52 of the positioning means 38.

For travel between workstations, the carrier 28 is supported in a vertically raised condition on the trolley 26 by latch means 54. Referring now to FIGS. 2-4, and more particularly to FIG. 3, the latch means 54 can include a latch arm 56 operatively connected to a lever arm 58 by a transfer link 60. The latch arm 56 pivots about a fixed point defined by a pivot pin 62 extending between parallel plates 48 connected to the trolley 26 as shown in FIG. 4. A pin-receiving portion 64 of the latch arm 56 receives therein a pin 66 fixed to the parallel plates 48 provided on the carrier 28. The lever arm 58 is pivotally mounted outside of one of the plates 48 about a fixed pivot point 68. The lever arm 56 is preferably biased, such as by a spring means 70, or the like, towards the position shown in FIG. 3.

Figure 5:
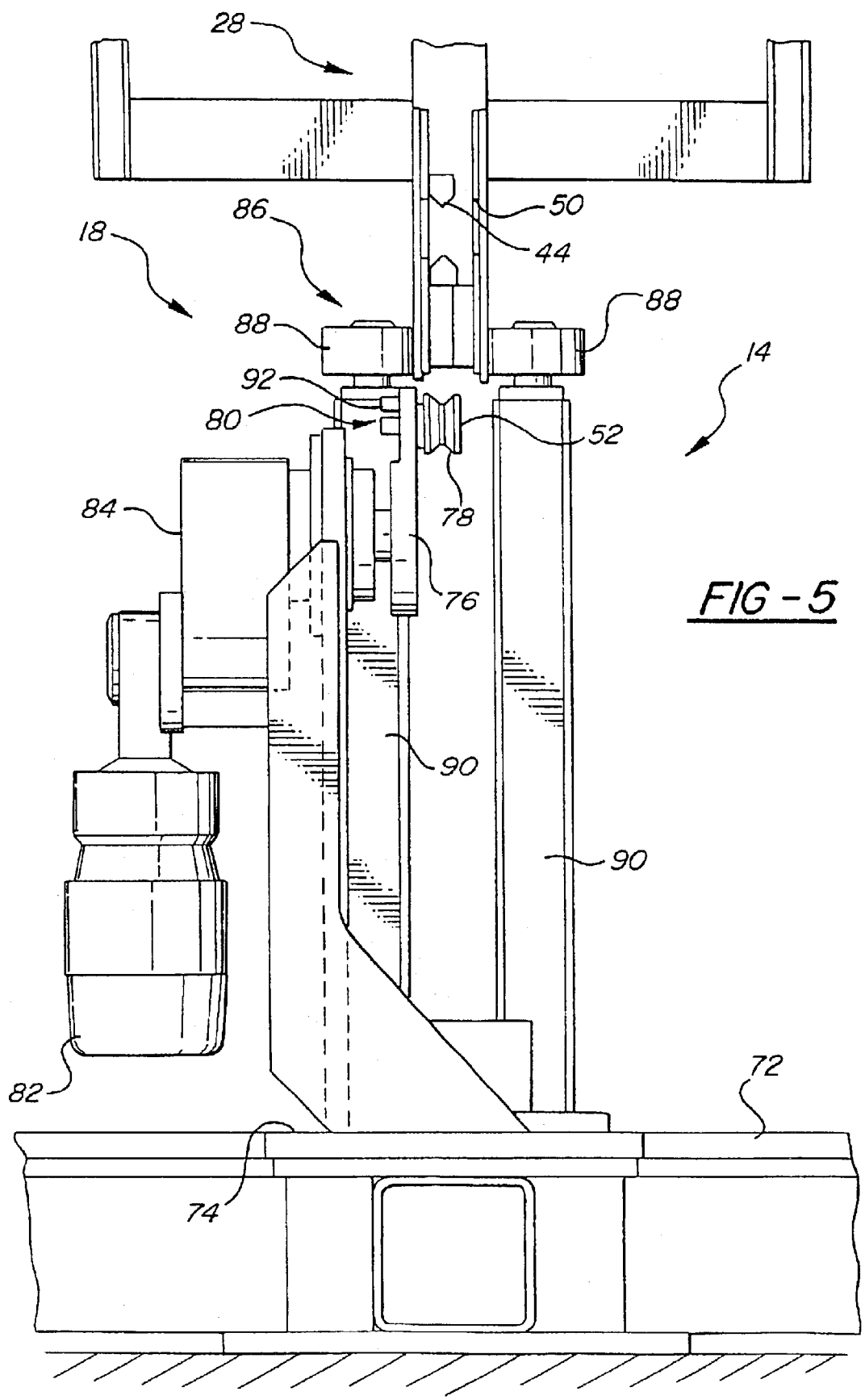
FIG. 5 is a detailed perspective view of the latch means and lowerator mechanism of the present invention.

In the embodiment shown in FIGS. 4–5, the lowerator 18 is shown provided at a workstation 14. The workstation 14 is shown with a base 72, and according to this embodiment, the lowerator 18 is fixedly mounted to the base 72 by appropriate support structure 74. The lowerator 18 can include a lifter arm 76 adapted for rotational movement. A roller 78 is rotatably mounted adjacent the terminal free end of the lifter arm 76. The roller 78 is receivable with respect to the cam surface 40, such as the illustrated channel. Means 80 for actuating the latch means 54 is provided adjacent the terminal end of the lifter arm 76, and extends radially outward from lifter roller 78. The latch actuating means 80 can include an actuator pin 92 projecting to engage the lever arm 58. The lowerator 18 is preferably motor-driven, and a motor 82 and gearbox 84 are provided in operative association with the lifter arm 76. The motor 82 can be powered by any desired conventional means. The radial dimensions of lifter arm 76 are such that, during rotational movement thereof, roller 78 is received with respect to the cam surface 40, such as the channel of the carrier 28, when the conveyance means 10 is positioned at the workstation 14.

Referring now to FIGS. 2 and 5, the lowerator 18 is provided in alignment at opposite ends of the conveyance means 10. The lowerator 18 is positioned at an appropriate workstation 14 in relation to the path of travel of the conveyance means 10 such that, after arrival of the conveyance means 10 at the workstation 14, rotational movement of the lifter arm 76 brings the roller 78 into contact with the cam surface 40, such as the channel of the carrier 28. As best seen in FIG. 5, guide means 86 is disposed at the workstation 14 to facilitate proper alignment of the lowerator 18 with the conveyance means 10, and prohibit unwanted lateral movement of the conveyance means 10 during operation of the lowerator 18. These guide means 86 can include horizontally oriented guide rollers 88 arranged on support posts 90 in opposing fashion on either side of horizontal member of the carrier 28 to define a path there between for receiving the conveyance means 10. Two such pairs of guide means 86 are preferably provided, one pair at predetermined locations of each end of the horizontal member when the conveyance means 10 come to a stop at the workstation 14.

Figure 6A:
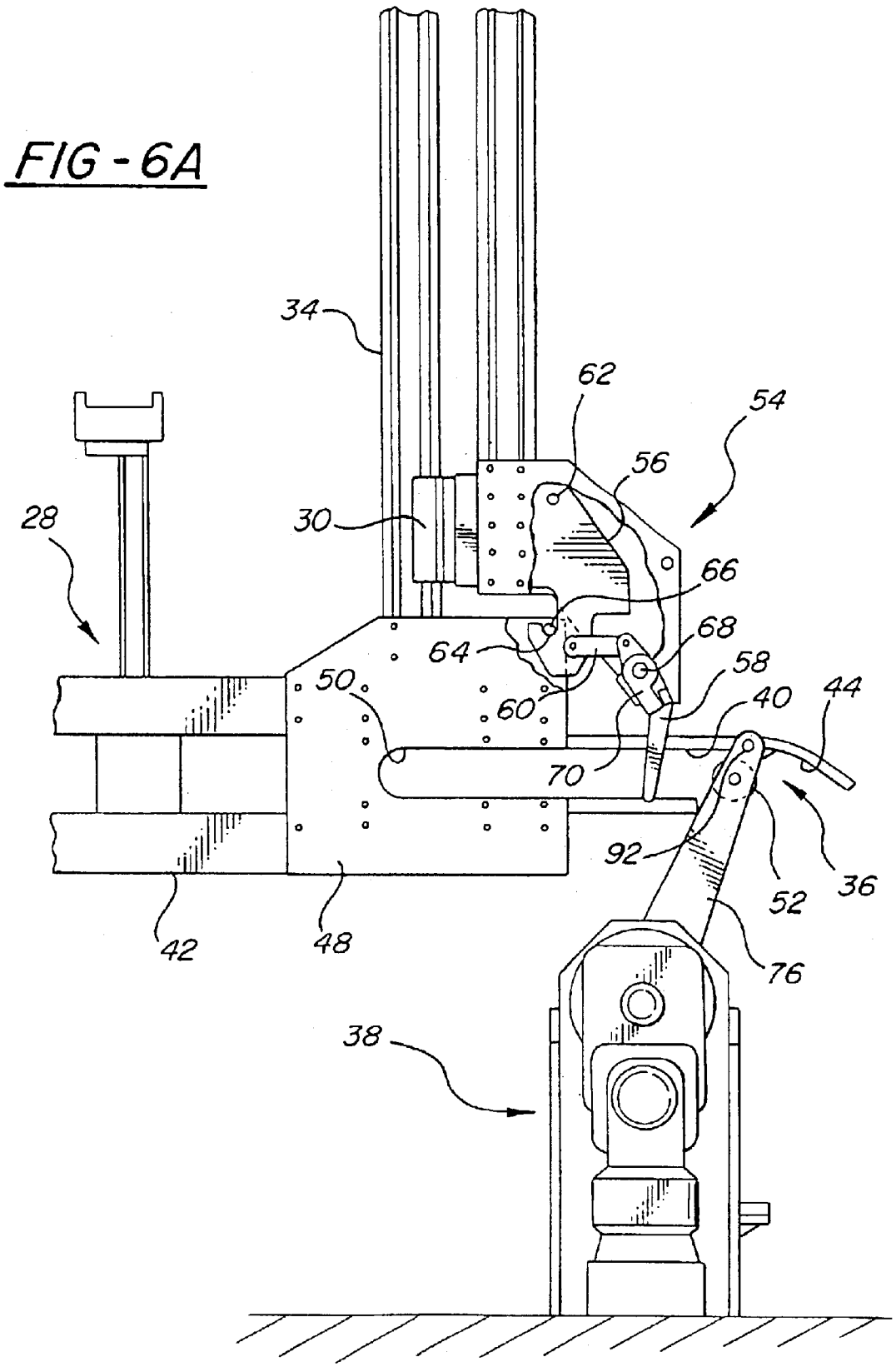
FIGS. 6A–6C provide detailed elevational views of the lowerator mechanism in operation.
Figure 6B:
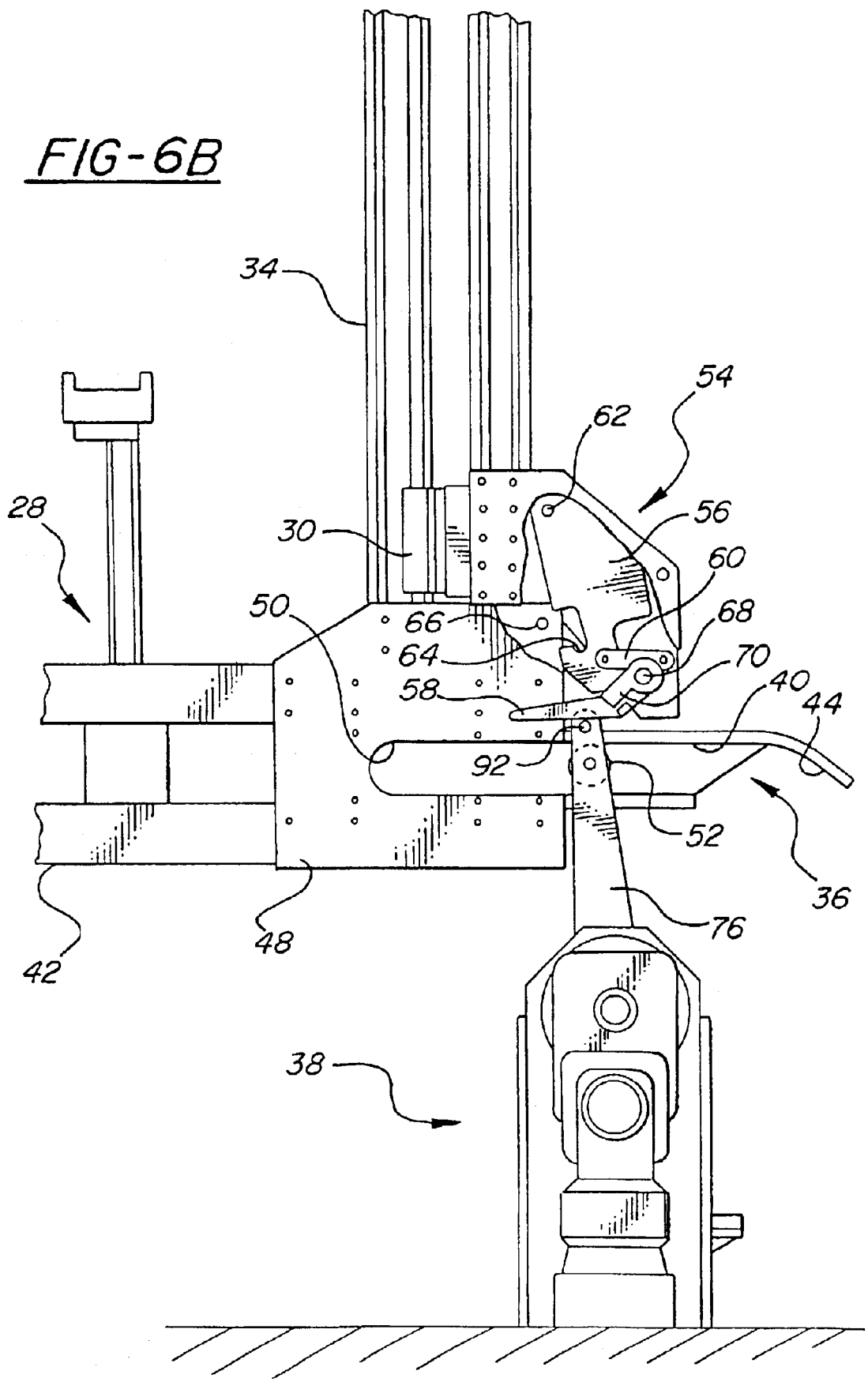
Figure 6C:
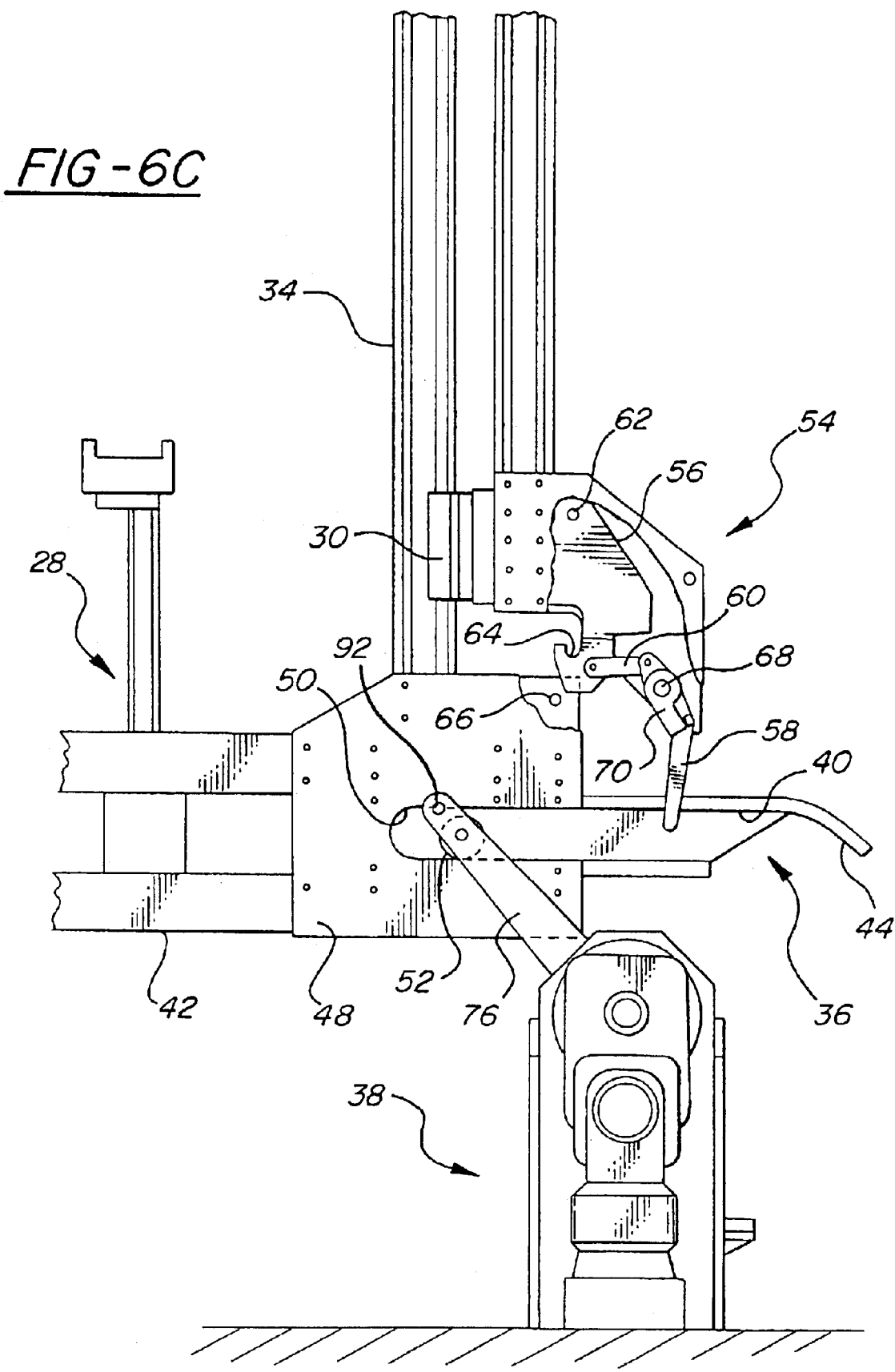
Figure 11:
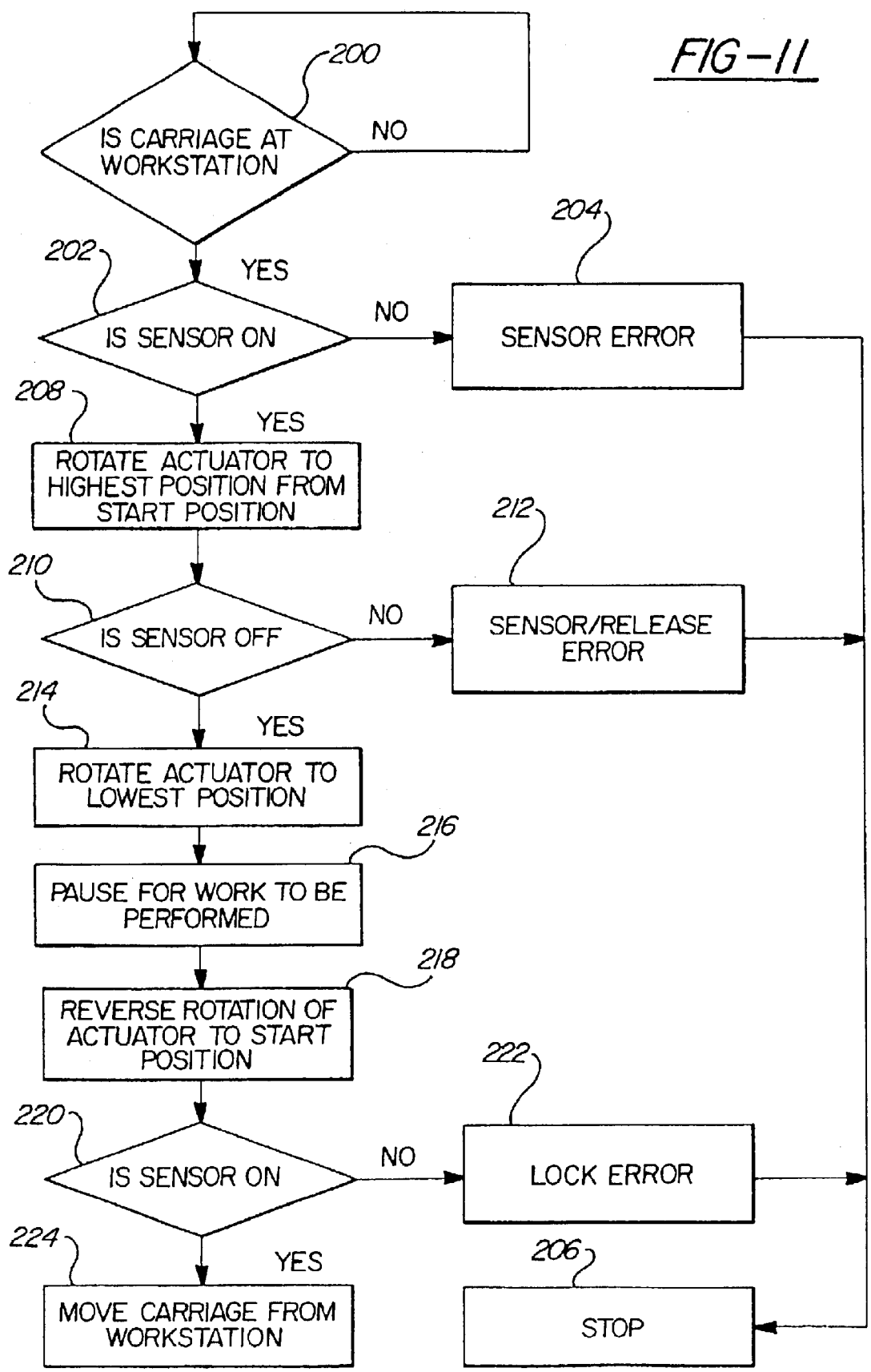
FIG. 11 is a simplified flow diagram of a control method for a lowerator according to the present invention.

Referring now to FIGS. 6A–6C, after arrival of the conveyance means 10 at the appropriate workstation 14, rotational movement of the lifter arm 76 commences. In the lowering cycle of operation, the lifter arm 76 rotates forwardly from a start position, shown in FIG. 4, bringing the roller 78 into engagement with the cam surface 40, such as the illustrated channel of the carrier 28, best seen in FIG. 6A. With continuing rotational movement of the lifter arm 76, the roller 78 circumscribes an arcuate path while moving upwardly within the illustrated channel, where the roller 78 engages cam surface 40 to urge the carrier 28 vertically upwards until reaching the maximum vertical height of the arc as best seen in FIG. 6B. This action drives the latch pin 66 upwards and out of engagement with the latch arm 56. Simultaneous with the upwards movement of the carrier 28, actuator pin 92 actuates the lever arm 58, urging the lever arm 58 to pivot about an axis in a first, clockwise direction. The rotation of the lever arm 58 urges the transfer link 60 in an outward direction "A" away from the pin 66 to draw the latch arm 56 out of the vertically downward path of travel of the pin 66. Continued forward rotational movement of the lifter arm 76 effects vertically downward movement of the carrier 28 relative to the trolley 26, until the carrier 28 is brought into position at the workstation 14 as best seen in FIG. 6C. Locator pins (not shown) may be provided at the workstation as necessary to receive the workpiece and/or carrier 28. It will be appreciated that the length of the cam surface 40, such as the channel of the carrier 28, is sufficient to provide for unimpeded movement of the roller 78 throughout the range of motion of the lifter arm 76, both in the counter clockwise direction, and for raising the carrier 28 to the latched position, the clockwise direction.

From the foregoing it will be appreciated that the operation of raising the carrier 28 into latched engagement with the trolley 26 takes place according to the foregoing description, except in reverse order of operation and with the lifter arm 76 rotating clockwise. Additionally, the latch arm 56 is not retracted by actuation of the lever arm 58 during the raising operation. As indicated, the lever arm 58 is biased towards its default position after the actuator pin 92 moves out of engagement therewith during the lowering operation. The latch arm 56 is thus positioned in the vertically upward path of travel of the pin 66. The latch arm 56 is provided with a ramped travel surface 94 for the pin 66. The ramped surface 94 is angled such that engagement of the latch pin 28 with the ramped surface 94 urges the latch arm 56 to pivot outward in direction "A" until the latch pin 66 passes out of engagement with the ramped surface 94, and the spring means 70 urges the latch means back to a biased position so that the latch pin 66 can be brought into engagement with the pin-receiving portion 64 of the latch arm 56 as the roller 78 moves through an arcuate path in the clockwise direction.

Those of skill in the art will appreciate that the harmonic motion of the carrier 28 brought about by the arcuate rotational path of the lifter arm 76 results in a so-called "soft touch" motion of the carrier 28 proximate the upper and lower limits of vertical range of motion. This "soft touch" motion is beneficial in reducing wear and tear on the lowerator 18, as well as providing for the relatively delicate handling of the workpiece.

Referring now to FIGS. 7–11, and more particularly FIGS. 7 and 8, the preferred embodiment of a lowerator 18a according to the present invention is illustrated. The present invention discloses an apparatus for transporting at least one workpiece along at least one rail 20a defining a path 12a of travel through a workstation 14a. While the present invention preferably includes a single electric monorail overhead system, the invention contemplates application to other known configurations of workpiece conveyors including multi-rail, both electric and non-electric, or non-electric monorail configurations. In the preferred configuration, a trolley 26a is movable along the rail 20a and is controllable to stop at the workstation 14a by appropriate switches and/or sensors and control circuitry as is known to those skilled in the art. A carrier 28a is connected to the trolley 26a for supporting at least one workpiece during movement of the trolley 26a along the rail 20a with respect to the workstation 14a. The carrier 28a is movable between a raised position, illustrated in FIGS. 7 and 8, and a lowered position, shown in phantom in FIG. 7, when positioned at the workstation 14a. At least one latch 54a is provided for maintaining the carrier 28a in the raised position with respect to the trolley 26a when the latch 54a is in the locked position. The latch 54a allows movement of the carrier 28a to the lowered position when the latch 54a is in the released position. An actuator 16a is provided for each latch 54a. Each actuator 16a is movable from a first position to a second position. As the actuator moves from the first position to the second position, the actuator 16a engages the carrier 28a, releases the latch 54a, and lowers the carrier 28a to the lowered position. While moving in the reverse direction from the second position to the first position, the actuator 16a raises the carrier 28a, locks the latch 54a, and disengages from the carrier 28a.

Preferably, the actuator 16a is supported separate from the rail 20a. In the preferred configuration, the actuator 16a is supported from the floor or base 72a of the workstation 14a. The actuator 16a has a cam follower or roller 78a connected to one end of a rotatable crank arm 76a. The cam follower is engageable with a cam surface 40a formed on the carriage 28a. The cam follower 78a is engageable with the cam surface 40a when the carriage 28a is stopped at the workstation 14a. Preferably, the cam follower 78a is in the form of a roller having an inner cylindrical spool surface positioned between radially enlarged flange members capable of guiding and maintaining the carrier 28a in operative contact with the cam follower 78a as the carrier 28a is moved between the raised position and the lowered position. In the preferred configuration, the cam surface 40a is formed as a bottom surface of the carrier 28a.

Referring now to FIGS. 7–9C, and more particularly to FIGS. 9A–9C, the preferred embodiment of the latch 54a includes a second cam engaging surface 40b for actuating the latch between the locked position and the released position. The latch 54a is rotated in response to engagement of the second cam surface 40b by the cam follower 78a as the cam follower 78a simultaneously moves along the first and second cam surfaces 40a, 40b. In the illustrated embodiment, the latch 54a is pivotally connected to the carrier 28a. A pair of telescoping posts or vertical elements 34a connect the carrier 28a to the trolley 26a. Slide blocks or bearing blocks 30a are enclosed within the telescoping posts 34a to prevent infiltration of foreign matter, while guiding movement of the carrier 28a with respect to the trolley 26a.

In the preferred configuration, best seen in FIGS. 9A, 9B and 10, at least one position sensor 96a, 96b, and 96c is supported with respect to the telescoping post 34a for generating a signal corresponding to a retracted and locked position of the post (illustrated in FIG. 10 in solid line). The position sensor 96a can be supported with respect to the post 34a to sense the position of the telescoping portion of the post 34a relative to the stationary portion 35a, as shown in FIG. 10. Alternatively or additionally, the sensor 96b can be supported with respect to the telescoping portion of the post 34b to sense the position of a surface 67 of the latch 54b, as shown in FIG. 9A. The sensor 96b can be mounted to the stationary portion 35b with a bracket 99. Alternatively or additionally, the sensor 96c can be supported with respect to the telescoping portion of the post 34c to sense the position of a tip 69 of the latch 54c, as shown in FIG. 9B. The sensor 96c can be mounted to the stationary portion 35b of the post 34c with a bracket 101. The sensors 96b and 96c can be positioned approximately one eighth of an inch (⅛") away from the surface 67 and the tip 69, respectively, when the latch 54A is in a locked position. The sensors 96a, 96b and 96c are shown schematically in FIGS. 10, 9A and 9B respectively. Control means 98a, 98b, and 98c such as one or more control circuits, is provided for receiving the signal from one or more of the position sensors 96a, 96b, and 96c for processing signals in accordance with a program stored in memory. Means 100a is provided for sensing if the carriage or workpiece conveyance means 10a is at the workstation 14a. If the carrier 28a is at the workstation 14a, the control means 98a (FIGS. 7 and 10) determines if the latch 54a is in the locked position. If the latch 54a is not in the locked position, the control means 98a generates an error signal. If the latch 54a is in the locked position, the control means 98a actuates the actuator 16a in a first direction of travel moving from the first or start position to an intermediate position. When the actuator 16a is in the intermediate position, the control means 98a determines if the latch 54a has been released from the locked position. If the latch 54a is still in the locked position when the actuator 16a is in the intermediate position, the control means 98a generates an error signal. If the latch 54a is in the released position when the actuator 16a is in the intermediate position, the control means 98a continues actuation of the actuator 16a from the intermediate position to a second position causing the carrier 28a to move from the raised position to the lowered position. After work has been performed on the workpiece at the workstation 14a when the carrier 28a is in the lowered position, the control means 98a actuates the actuator 16a in a second direction of travel to move from the second position to the first position. When the actuator 16a has returned to the first position, the control means 98a determines if the carrier 28a is in the raised and locked position through the position sensor 96a. If the carrier 28a is not in the raised and locked position when the actuator 16a is in the first position, the control means 98a generates an error signal. If the carrier 28a is in the raised and locked position when the actuator 16a is in the first position, the control means 98a generates a signal for activating the motor driven trolley 26a for moving the carriage 28a from the workstation 14a.

In operation, conveying means such as trolley 26a is driven along rail means defining a path of travel with respect to a workstation 14a. The conveying means includes a carrier 28a for supporting at least one workpiece for delivery to the workstation 14a. As the trolley 26a and carrier 28a approach the workstation 14a, the carrier 28a operably engages guide means 86a for aligning and orienting the carrier 28a in the proper position as the carrier 28a enters the workstation 14a for operative engagement with the lowerator 18a located at the workstation 14a. The guide means 86a can include a pair of converging guide rails to direct the leading edge of the carrier 28a into the proper position as the carrier 28a enters the workstation 14a, and/or can include a pair of rollers 88a rotatably supported on posts 90a for guiding the leading edge of the carrier 28a into the proper orientation as it enters the workstation 14a.

When the trolley 26a has reached a predetermined position at the workstation 14a, the motor driven trolley 26a is stopped and a signal is generated by a sensor 100a indicating that the carrier 28a is at the workstation. The signal is received by the control means 98a and processed according to a control program stored in memory. The control program can include the steps illustrated in FIG. 11. Initially, the program determines if the carrier 28a is at the workstation in query step 200. If a signal indicating that the carrier 28a is at the workstation 14a is not received, the program branches back to reiterate the same query in step 200. When a signal is received from the sensor 100a indicating that the carrier 28a is at the workstation 14a, the program continues to the next query step 202 to determine if the position sensor 96a indicates that the carrier 28a is in the raised and locked position. The position sensor 96a can be in the form of a proximity sensor as illustrated in FIG. 10 positioned appropriately to operatively indicate the presence of a radially extending metal portion of the post 34a when in the raised and locked position as illustrated in solid line. If the position sensor 96a is not generating a signal, the control program branches to generate an error signal in step 204 indicating that a sensor failure has occurred. After indicating that there is a sensor failure, the program continues to step 206 where further operations are stopped pending operator determination of the cause of the sensor error reported in step 204. If a signal is received from the position sensor 96a indicating that the carrier 28a is in the raised and locked position, the program continues on to step 208 where the motor 82a is activated in order to drive the lifter arm 76a through gear box 84a to bring the cam follower or roller 78a into operative engagement with the first cam surface 40a formed on the bottom of the carrier 28a. Preferably, the lifter arm 76a is driven in a first rotational direction and engages the bottom of the carrier 28a prior to reaching the upper limit of travel through the defined arc of rotation. As best seen in FIG. 9A, as the lifter arm 76a continues to rotate from the start position, and when at approximately 16° of rotation, the roller 78a has lifted the carrier 28a a sufficient distance to relieve the weight from the latch 54a, or approximately 0.375 inches. As the roller 78a is raising the carrier 28a, the roller 78a simultaneously engages the second cam surface 40a as the roller 78a continues to engage the first cam surface 40a. The lifting motion of the carrier 28a raises the latch 54a a sufficient distance to remove the pin 66a from the pin-receiving portion 64a of the latch arm 56. As the carrier 28a is being lifted by the roller 78a, the outwardly extending metal portion of the post 34a is also raised and moved toward the position shown in phantom in FIG. 10. As the roller 78a reaches the upper limit of travel, the radially outwardly extending metal portion of the post 34a reaches the position shown in phantom and the signal from the position sensor 96a is lost or discontinued. The uppermost position of the roller 78a is shown in FIG. 9B where the roller 78a has continued simultaneous contact with the first and second cam surfaces 40a, 40b and is in the process of rotating the latch arm 56a about the pivot 62a to unlatch the carrier 28a from the trolley 26a. When in this uppermost or intermediate position, the control program proceeds to the next query step 210 to determine if the position sensor signal has been discontinued. If the signal from the position sensor 96a is still present, the program branches to step 212 to indicate a sensor and/or release error, since the carrier 28a has not been raised a sufficient distance to unlatch the carrier 28a from the trolley 26a and continued movement would therefore cause damage to the conveying structure. The program then continues on to the stop step 206 where no further action is taken until an operator determines the cause of the error. If the signal from the position sensor 96a has been discontinued, the control program continues on to step 214 where rotation of the lever arm 76a continues without stopping through the intermediate position to rotate the actuator to the lowest position placing the carrier 28a in the position shown in phantom in FIG. 7. As the roller 78a passes through the intermediate position, the simultaneous engagement with the first and second cam surfaces 40a, 40b rotates the lever arm 56a a sufficient distance to completely release the pin 66a and bypass the pin as the carrier 28a is lowered. The position of the roller 78a illustrated in FIG. 9C is approximately 45° from the start position and the carrier 28a has been lowered approximately 0.375 inches down from the fully raised position. When the carrier 28a is in the lowest position, work is performed on the workpiece or workpieces that have been transferred to the workstation 14a. After completion of the work being performed at the workstation 14a, an appropriate signal is sent to the control means 98a and the motor 82a is activated in the reverse direction to move the lifter arm 76a through the gear box 84a from the lowest or second position back toward the first or start position. The pause for work to be performed is illustrated in step 216 of the control program followed by step 218 indicating reverse rotation of the actuator to the start position. When rotating in the reverse direction, the roller 78a passes through the reverse order of movement previously described, first reaching the position illustrated in FIG. 9C, then FIG. 9B, followed by FIG. 9A, and finally back to the start position illustrated in FIGS. 7 and 8. When in the start position, the radially outwardly extending metal portion of the post 34a has returned to the solid line position illustrated in FIG. 10, and the control program continues to query step 220 to determine if the position sensor 96a is generating a signal to the control means 98a. If no signal is received from the position sensor 96a, the control program branches to step 222 where an error signal is generated indicating a sensor or lock error. The program then continues on to the stop step 206 where no further action is taken until the cause of the error is determined by an operator. If the signal from the position sensor 96a is received by the control means 98a, the program branches to the step 224 allowing the motor trolley 26a to be energized to remove the carrier 28a from the workstation 14a. Preferably, biasing means 102a is provided for urging the lever 56a toward the unlocked position of rotation with respect to pivot pin 62a. In the preferred configuration, the lower portion of the carrier 28a is formed as a box beam having a cutout portion for receiving the rotatable latch arm 56a.

The present invention discloses a simple, efficient, and reliable assembly system including an overhead rail means defining a path of travel with respect to a workstation, and means for conveying a workpiece along the rail means. The conveying means according to the present invention includes a carrier for supporting at least one workpiece for delivery to the workstation, where the carrier is movably associated with the conveying means so as to be vertically positionable between raised and lowered positions with respect to the conveying means. A lowerator according to the present invention automatically moves the carrier between the raised and lowered positions. Latch means is provided for securing the carrier to the conveying means in the raised position for transport to and from the workstation. At least one lifter defines a path of travel in first and second directions, where during movement in the first direction the lifter actuates the latch means to uncouple the carrier from the conveying means, for movement into the lowered position, and where during movement in the second direction the lifter lifts the carrier from the lowered position to the raised position and actuates the latch means so as to secure the carrier to the conveying means in the raised position.

In the preferred configuration, at least two vertically extending members or posts are provided at opposite ends of the carrier, and a latch and position sensor is associated with each post, where the position sensor can signal if the carrier has been raised and placed in the locked position prior to transport out of the workstation, and can also determine if the carrier has been raised sufficiently and unlatched prior to movement of the carrier into the lowered position. If either of the sensors does not generate the appropriate signal, the control program automatically stops further actuation of the lowerator mechanism. It is believed that only one sensor is required for each post in order to determine the position of the vertical member and the latch, however multiple sensors could be provided for additional signals to the control means without departing from the spirit and scope of the present invention.

Figure 12:
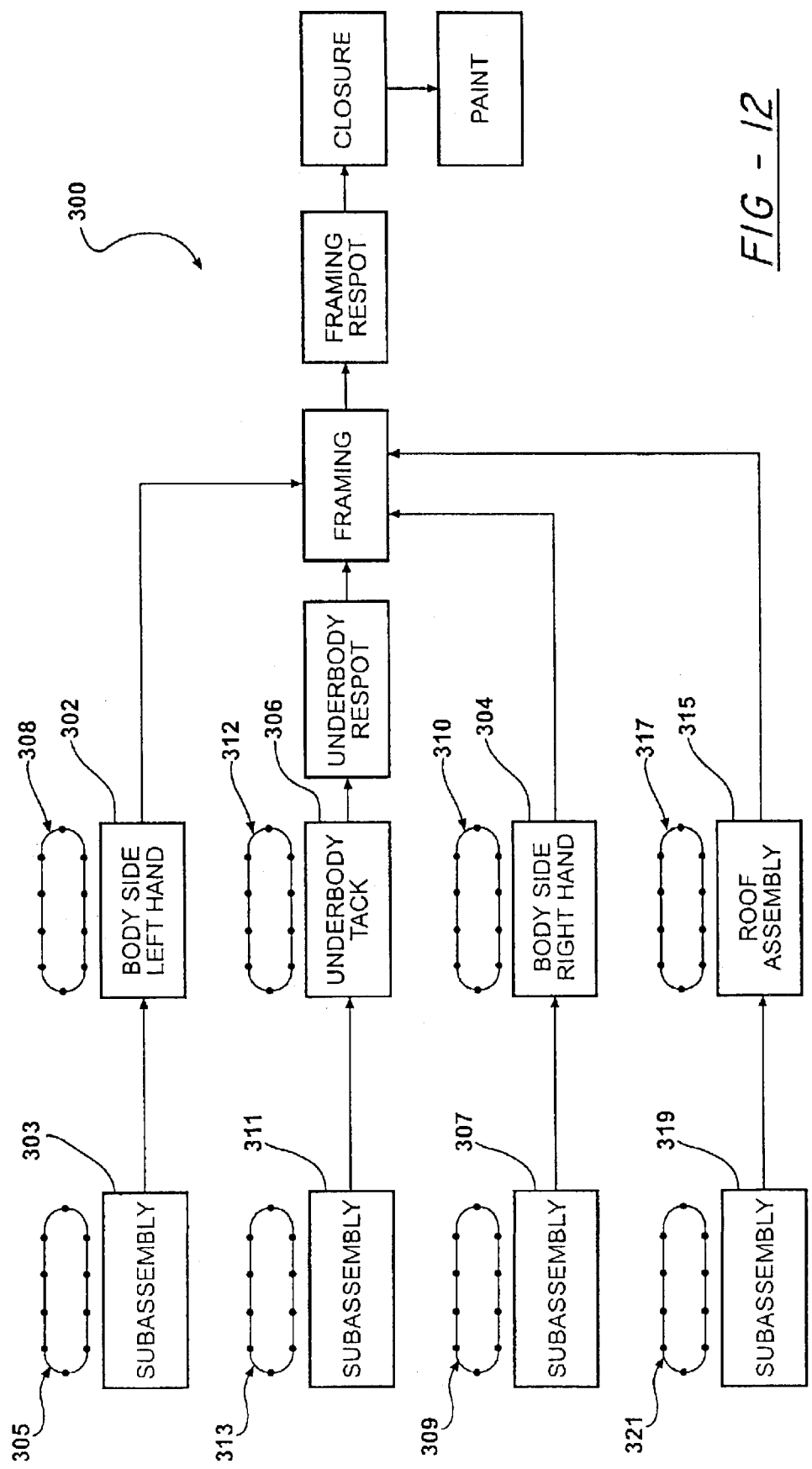
FIG. 12 is a simplified schematic illustrating the overhead transfer system for component parts to the point where the underbody is put on a pallet system at the underbody respot workstation, and the bodyside preassemblies are attached to the underbody at the framing workstation.

Referring now to FIG. 12, a simplified schematic diagram of the overall body assembly line 300 is illustrated. Solid lines between boxes represent transport of parts between boxes with an overhead transport system. Double lines between boxes represent transport of parts with a pallet transport system. The bodyside left hand panel assembly line is illustrated as a single box 302 in this simplified schematic drawing. The bodyside right hand assembly line is illustrated as a single box 304 in this diagram. Box 306 illustrates the entire underbody assembly line and tack weld station in this diagram. In the preferred configuration, the bodyside left hand assembly line 302, bodyside right hand assembly line 304, and underbody assembly line 306 through the tack weld workstation are part of individual overhead transport systems for each of the lines illustrated as ovals in the schematic drawing numbered 308, 310, and 312 respectively.

The first overhead transport system 308 delivers parts or components in various stages of assembly along the bodyside left hand assembly line 302 between the various workstations.

Preferably, the first overhead transport system 308 is a closed loop system passing through the various workstations and passing through a workpiece support for antler exchange workstation, where the workpiece support or antlers can be exchanged depending on the body style or model to be assembled through the assembly line without interrupting production. The first overhead transport system 308 can be supplied with subassemblies from at least one subassembly line 303 having an overhead transport system 305.

The overhead transport systems 308, 305 can be independent from one another or can be integrated into a single overhead transport system. The second overhead transport system 310 transports parts or components in assembled or partially assembled states between the various workstations of the bodyside right hand assembly line 304. Preferably, the second overhead transport system 310 is a closed loop system passing through each of the workstations of the bodyside right hand assembly line 304 and through a workpiece support or antler exchange workstation. The second overhead transport system 310 can be supplied with subassemblies from at least one subassembly line 307 having an overhead transport system 309. The overhead transport systems 309, 310 can be independent from one another or can be integrated into a single overhead transport system. At the workpiece support or antler exchange workstation, the workpiece support or antlers carried by each overhead transport system carriage can be changed as required depending on the body style or model to be assembled without interrupting production.

The third overhead transport system 312 carries parts or components in assembled or partially assembled condition between the various workstations for the underbody assembly line 306 and tack weld station. Preferably the third overhead transport system 312 is a closed loop system passing through each workstation of the underbody assembly line 306 including the tack weld station, and through a workpiece support or antler exchange workstation. The third overhead transport system 312 can be supplied with subassemblies from at least one subassembly line 311 having an overhead transport system 313. The overhead transport systems 312, 313 can be independent from one another or can be integrated into a single overhead transport system.

The overall assembly line can also include a roof assembly line 315 having a fourth overhead transport system 317. The fourth overhead transport system 317 carries parts or components in assembled or partially assembled condition between the various workstations for the roof assembly line 315. Preferably the fourth overhead transport system is a closed loop system passing through each workstation of the roof assembly line 315 and through a workpiece support or outer exchange workstation. The fourth overhead transport system 317 can be supplied with subassemblies from at least one subassembly line 319 having an overhead transport system 321. The overhead transport systems 317, 321 can be independent of one another or can be integrated into a single overhead transport system.

The workpiece support or antler exchange workstation permits the workpiece support or antlers for each overhead transport carriage to be exchanged depending on the automotive body style or model to be produced through the assembly line without interrupting production. In its preferred form, each overhead transport system, 305, 308, 309, 310, 312, 313, 317, 321 has an electric monorail system. In its most preferred configuration, each overhead transport system 305, 308, 309, 310, 312, 313, 317, 321 is an electric monorail system having a plurality of carriages with a plurality of vertically extending supports or posts with lower portions moveable between a lowered position and a raised position. The electric monorail system conveys the carriages along a path of travel between workstations on the assembly line to convey a workpiece to one or more workstations along the path of travel and to raise and lower the workpiece with respect to a tooling fixture, workpiece support, or geometry fixture at the various workstations as required. Details of the overhead transport systems 305, 308, 309, 310, 312, 313, 317, 321 can be obtained from the description of FIGS. 1–11 given in greater detail above.

Figure 14D:
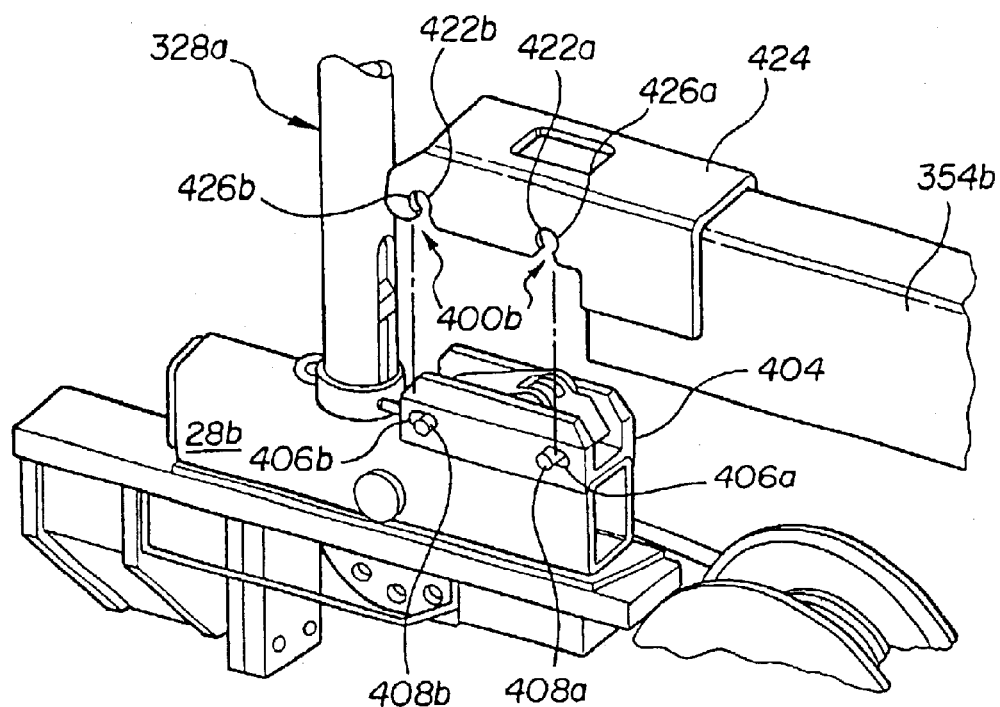
Figure 14E:
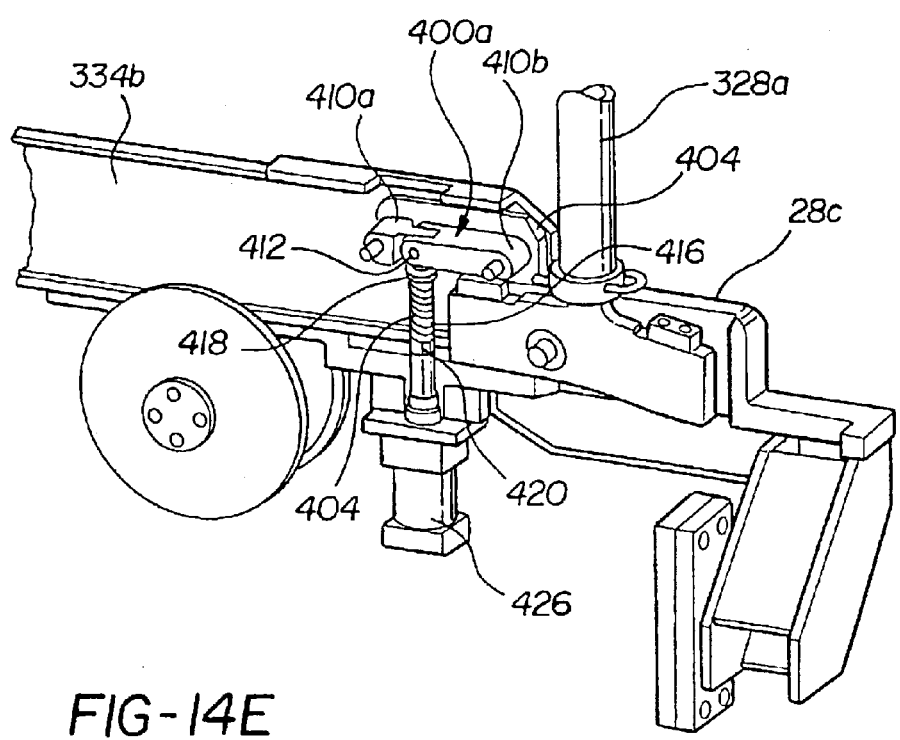
Figure 15:
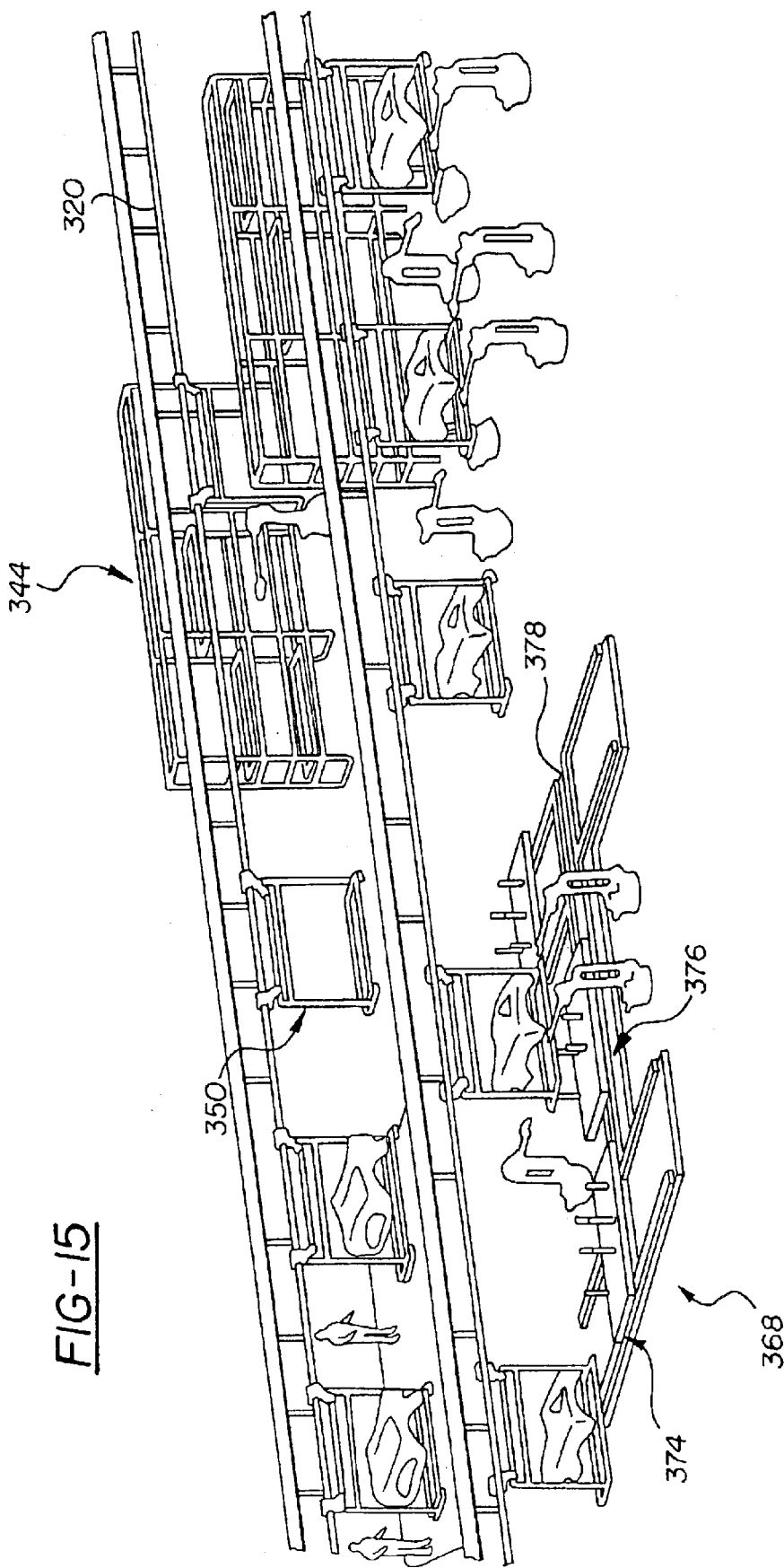
FIG. 15 is a perspective view of an assembly line portion with an overhead delivery system passing through a workpiece support or antler exchange workstation, where the workpiece support or antlers can be changed over to a new body style or model configuration during production and a perspective view of an H-Gate delivery system for a work support or geometry fixture at a welding workstation.

Referring now to FIGS. 13–15, by way of example and not limitation, one possible configuration of the overhead transport system 312 of the underbody assembly line and tack weld station 306 is illustrated. The configuration illustrated in FIG. 13 shows an electric monorail system 320 with an overhead monorail 322 supporting first and second carriages 324, 326 for movement along the path of travel. Vertically extending supports or pillars 328 extend downwardly from the first and second carriages 324, 326. A horizontal support member 330 extends between the vertically extending supports or pillars 328. Preferably, a single drive mechanism 332 is associated with each vertically extending support or pillar 328 for unlatching the horizontal support member 330 from a locked position with respect to the vertically extended supports or pillars 328 and for lowering the horizontal support member 330 to a lowered position causing the carried workpiece to be transferred to a geometry fixture, sometimes referred to herein as a tooling fixture or workpiece support, as required for the particular workstation. The single drive mechanism 332 operates in synchronization with the other single drive mechanism associated with the other vertically extending supports or pillars 328 to raise the horizontal support member 330 from the lowered position and to re-latch the horizontal support member 330 with respect to the vertically extending supports or pillars 328 prior to the first and second carriages 324, 326 leaving the workstation for further movement along the overhead rail 322.

Referring now to FIG. 14, the horizontal support member 330 preferably provides the ability to interchange the workpiece support or antler nest 334 to match the particular automotive body style or model to be produced on the assembly line without interrupting production. The workpiece support or antler nest 334 is engageable on locating pins 336 located on the horizontal support member 330. The locating pins accurately locate the workpiece support or antler nest 334 with respect to the horizontal support member 330. Preferably, the locating pins 336 include at least one outwardly driven, or biased, latch member or ball for locking the nest 334 in position on the support member 330. Vertically extending retainer plates 338, as shown in FIG. 14C, on either side of the horizontal support member 330 maintain the workpiece or support or antler nest 334 from lateral shifting with respect to the horizontal support member 330. If required, a latch member can be provided to lock the workpiece support or antler nest 334 with respect to the horizontal support member 330. The workpiece support or antler nest 334 includes transversely extending surfaces 340 defining at least one slot or pocket 342 for engagement by an automated workpiece support or antler nest exchange unit.

Referring now to FIGS. 14D and 14E, each end of the antler nest or cross bar 334b can be releasibly connected to couplings 28b, 28c with locks 400a, 400b at the lower ends of the telescoping posts 328a to define the carrier. The locks 400a, 400b can include housings 404a, 404b mounted on the lower ends of each telescoping posts 328a of the carrier. The carrier is formed of three parts connectible to one another; namely couplings 28b and 28c, and the antler nest or cross bar 334b bridging the gap between the couplings 28b and 28c. Each housing 404a, 404b can include guide slots 406a and 406b for receiving and guiding the travel of locking pins 408a and 408b, respectively, between an extended locking position and a retracted releasing position. The locking pins 408a and 408b are connected to rotatable links 410a and 410b, respectively. The links 410a and 410b are pivotally coupled together by a common pivot pin 412. A reciprocal actuator pin 414 operably engages links 410a and 410b adjacent the common pivot pin 412. The reciprocal actuator pin 414 is biased in a first position by a biasing means 413, such as a spring, positioned between a washer 418 engageable with the frame 404 and a flange 420 extending from the pin 414 adjacent one end. The biased position of the pin 414 corresponds to the extended, locked position of the locking pins 408a and 408b relative to the couplings 28b, 28c and the antler nest 334b. The locking pins 408a and 408b operably engage with the guide slots 406a and 406b and are engageable with the slots 422a and 422b formed in corresponding brackets 424a, 424b mounted on opposite ends of the antler nest 334b.

In operation, each end of an antler nest 334b is engaged with a corresponding coupling 28b, 28c by moving the reciprocal actuator pin 414 against the urging biasing of means 413 to a second position by drive means 426. The drive means 426 can be an electric, hydraulic or pneumatic linear actuator for moving the actuator pin between the first and second positions. As the actuator pin 414 travels from the first position, or locked position, to the second position, or released position, the common pivot pin 412 is moved to rotate links 410a and 410b. Contemporaneously, the locking pins 408a and 408b travel in the guide slots 406a and 406b towards each other. When the pin 414 is in the second position, corresponding to an unlocked position between the antler nest 334b and the couplings 28b, 28c, the antler nests 334b can be removed and exchanged by lifting movement to slide locking pins 408a and 408b out from engagement with the brackets 424a and 424b through corresponding slots 422a and 422b. A new antler nest 334b can be replaced by directing corresponding brackets 424a and 424b over the locking pins 408a and 408b when lowering the antler nest 334b with respect to the couplings 28b, 28c of the carrier. After the antler nest has been lowered and the locking pins 408a and 408b are positioned in the slots 422a and 422b, the actuator pin 414 can be moved to the first position by deactivating the drive means 426 allowing the biasing means 413 to move the actuator pin 414 from the second position to the first position. As the drive means 424 moves the actuator pin 414 to the first position, the links 410a and 410b rotate toward a vertically aligned position and locking pins 408a and 408b move away from one another toward the ends 426a and 426b of the slots 422a and 422b to lock the brackets 424a, 424b of the antler nest 334b to the couplings 28b, 28c to define the new carrier configuration. It should be recognized that the operation of the drive means could be reversed to move the actuator pin downwardly to release and upwardly to lock without departing from the scope of the present invention. Furthermore, it should be recognized that the operation of the locking pins could be reversed to move toward one another to lock and away from one another to release without departing from the scope of the present invention. The present invention provides means for coupling each telescoping post to a selected interchangeable antler nest. Means is provided for releasibly locking each telescoping post with respect to the selected one of a plurality of interchangeable antler nests, where the releasible locking means is moveable between a released position and a locked position. Drive means is provided for moving the locking means between the released position and the locked position. Biasing means urges the locking means toward the locked position in a normal state.

Figure 16:
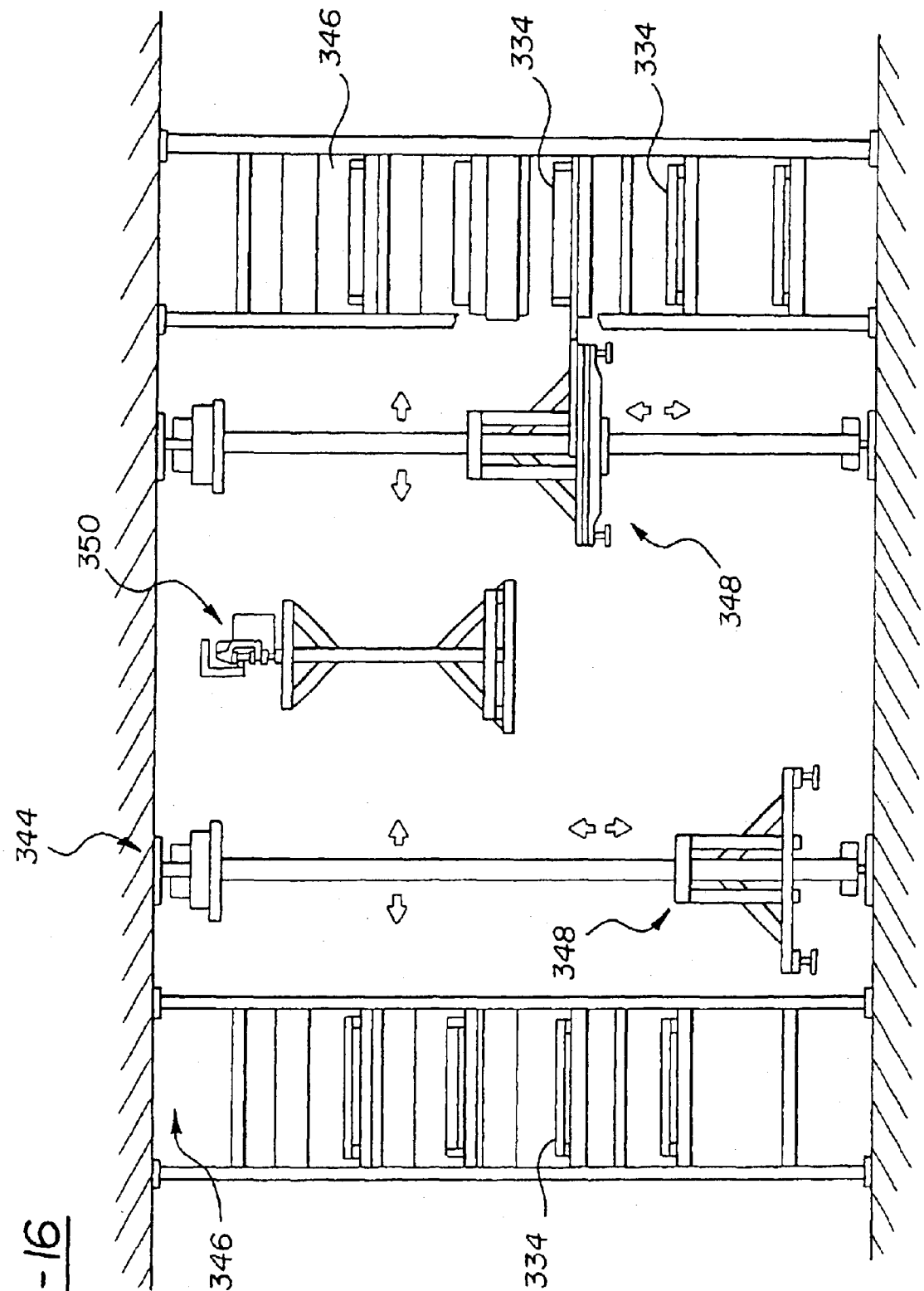
FIG. 16 is a side elevational view of a workpiece support or antler or tray style selection apparatus for removing a previously used workpiece support or antler configuration and installing a new workpiece support or antler configuration for a new body style or model.

Referring now to FIGS. 15 and 16, a workpiece support or antler nest exchange workstation is provided along the path of travel of the overhead transport system. At the exchange workstation 344, storage facilities are provided for holding a sufficient quantity of workstation supports or antler nests 334 to exchange out a predetermined portion, or an entire assembly line of the electric monorail system 320. As best seen in FIG. 16, storage locations 346 can be provided for a plurality of workpiece supports or antler nests 334 extending vertically and horizontally along the path of travel of the overhead transport system. Storage locations 346 can be provided for the workpiece support or antler nest 334 being taken out of service, while a new workpiece support or antler nest 334 is taken from a storage location 346 to be put into service. One or more automated handling units 348 can be provided for engaging members with respect to the one or more slots or pockets 342 formed in the workpiece support or antler nest 334 currently engaged on the horizontal support member 330. Alternatively, as shown in FIG. 16A, a robot 430 can engage an antler nest 334c, mounted on couplings 28d, 28e with locks 400d and 400e, by lifting the antler nest 334c with an appropriately shaped gripper assembly. Clamps 431a, 431b can be provided on the gripper assembly for grasping the antler nest during the exchange and transport process. If required, the corresponding latch or latches are disengaged to release the workpiece support or antler nest 334 from the horizontal support member 330. The automated handling unit 348 then lifts the workpiece support or antler nest 334 from the locating pins 336 to disengage the workpiece support or antler nest 334 from the horizontal support member 330. After the workpiece support or antler nest 334 is disengaged from the horizontal support member 330, the workpiece support or antler nest 334 can be positioned in an empty storage location 346. Depending on the speed of the overhead transport system, the same automated handling unit, or a different automated handling unit, at the same exchange workstation, or at a second exchange workstation, can locate and retrieve the desired new workpiece support or antler nest 334 from the corresponding storage location 346. The automated handling unit 348 removes the workpiece support or antler nest 334 from the storage location 346 and positions the workpiece support or antler nest 334 directly above the locating pins 336 on the horizontal support member 330. The automated handling unit 348 lowers the new workpiece support or antler nest 334 onto the locating pins 336 to position the workpiece support or antler nest 334 with respect to the horizontal support member 330. If required, a latch or multiple latches are actuated to lock the workpiece support or antler nest 334 with respect to the horizontal support member 330. The overhead transport system then can move the trolley or workpiece carrier 350 from the exchange loading station to the next station along the path of travel of the overhead rail 322. The process is then repeated for each successive trolley 350 delivered to the exchange workstation as required for a portion of or the complete number of trolleys existing in the overhead transport system as required for the particular automotive body style or model to be assembled.

Referring now to FIG. 16A, an exchange workstation 344a is provided to exchange an antler nest 334b. Storage facilities can be provided at the exchange workstation 344a for holding a sufficient quantity of antler nests 334b, of the same or different configurations as required, to exchange out a predetermined portion, or an entire assembly line of the electric monorail system 320. Storage locations similar to storage locations 346 can be provided for each antler nest 334*b* extending vertically and horizontally along the path of travel of the overhead transport system. Empty storage locations can be provided for storing a workpiece support or antler nest 334*b* being taken out of service, while a replacement workpiece support or antler nest 334*b* is taken from another storage location and put into service. The exchange workstation 344*a* can exchange antler nests 334*b* having locks 400. The exchange workstation 344*a* can have a plurality of drive means 426 for releasing each lock engaging the antler nest 334*b* with the telescoping posts 328*a* through couplings 28*c* and 28*b*. FIGS. 14D and 14E provide a detailed illustration of this engagement. The exchange workstation 344*a* can include one or more automated exchange units 430 for lifting an antler nest 344*b* away from the telescoping posts 328*a* of the carrier. The unit 430 can include jaws 431*a* and 431*b* to grasp the antler nest 334*b* and disengage the antler nest 334*b* from the coupling 28*c* and 28*b* of the carrier.

Figure 18:
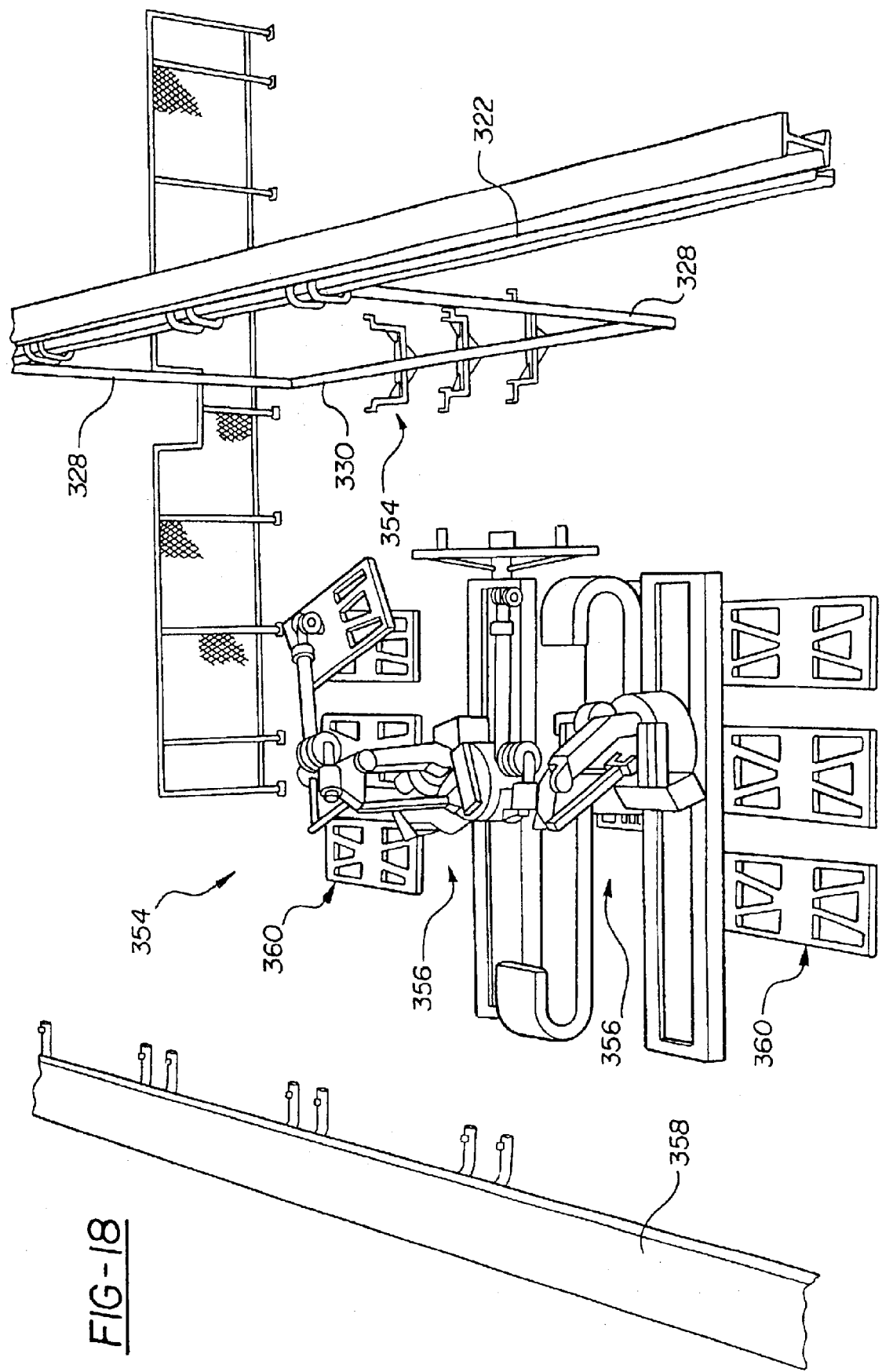
FIG. 18 is a perspective view of a load and/or unload automated workstation for the overhead delivery system between flexible body assembly workstations according to the present invention.

Referring now to FIG. 17, the trolley or workpiece carrier 350 can stop at one or more manual or automated loading stations 352. The loading station 352 can be located before the first flexible body assembly workstation, or in between flexible body assembly workstations as required. At the manual loading station 352 as illustrated in FIG. 17, parts can be supplied in quantity for manual placement with respect to the workpiece support or antler nest 334 carried by the trolley 350. Referring now to FIG. 18, an automated loading/unloading station 354 is illustrated. The overhead electric monorail system 320 delivers the trolley 350 to the workstation. If required, the horizontal support member 330 is lowered by single drive mechanisms 332 (FIG. 13) for transferring the supported workpiece or component to a stationary workpiece support or geometry fixture (not shown) at the workstation. Automated equipment, such as one or more robots 356, can be used to transfer parts to and from the overhead electric monorail system 320 with respect to a second part or component delivery system 358. A plurality of predefined fixtures 360 can be provided for each robot 356 or automated loading and unloading equipment in order to properly engage and hold the current workpiece corresponding to a particular automotive body style or model for transfer from one transport system to the other. This action can be performed to load the overhead monorail system 320, or to unload the overhead monorail system 320. The predefined fixtures 360 can be changed as required for meeting the production requirements of the particular automobile bodystyle or models to be manufactured through the assembly line.

Figure 19:
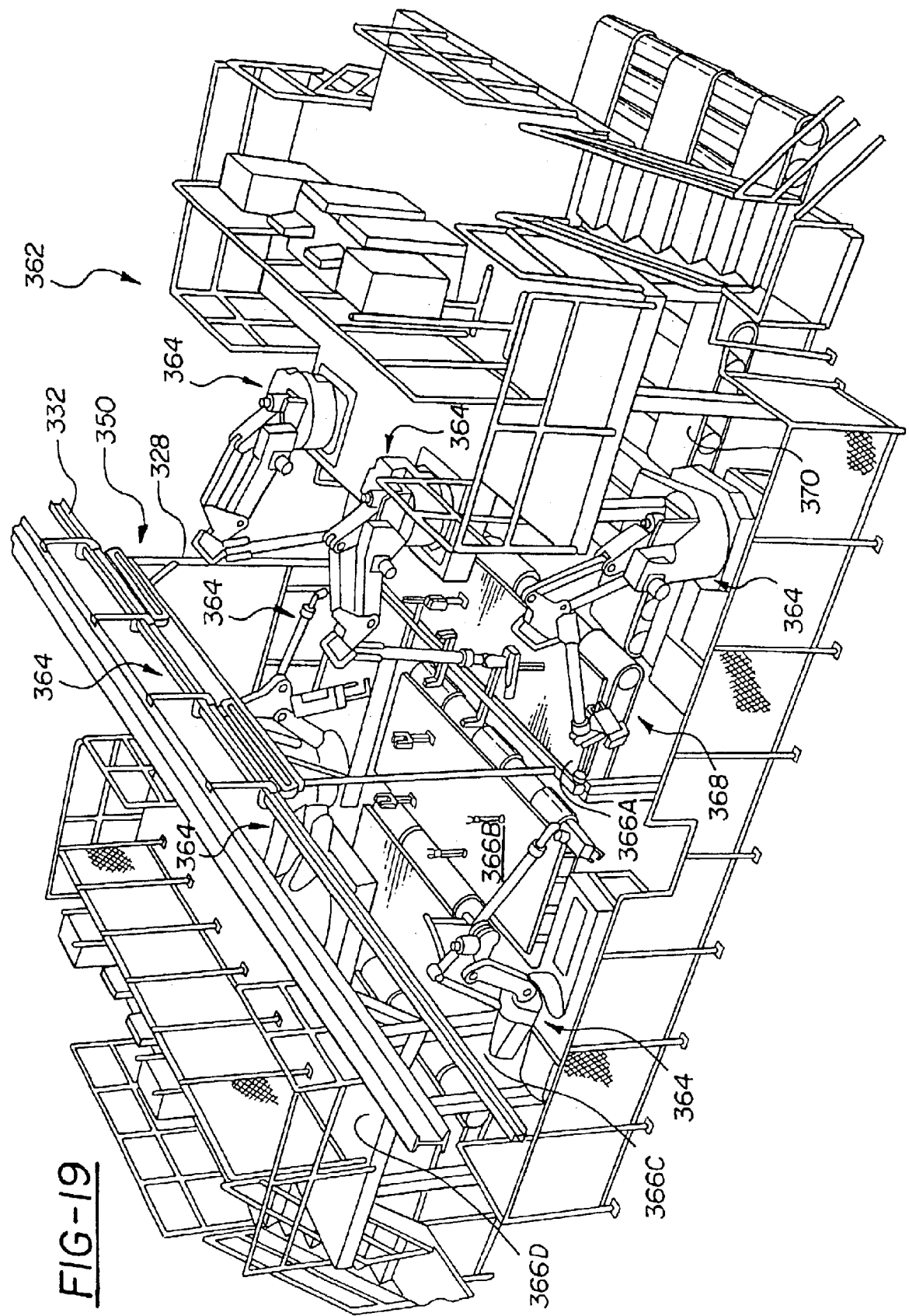
FIG. 19 is a perspective view of a flexible body assembly workstation according to the present invention having a plurality of welding robots positioned about the workstation, and overhead delivery system, and an interchangeable workpiece support or geometry fixture at the workstation.
Figure 20:
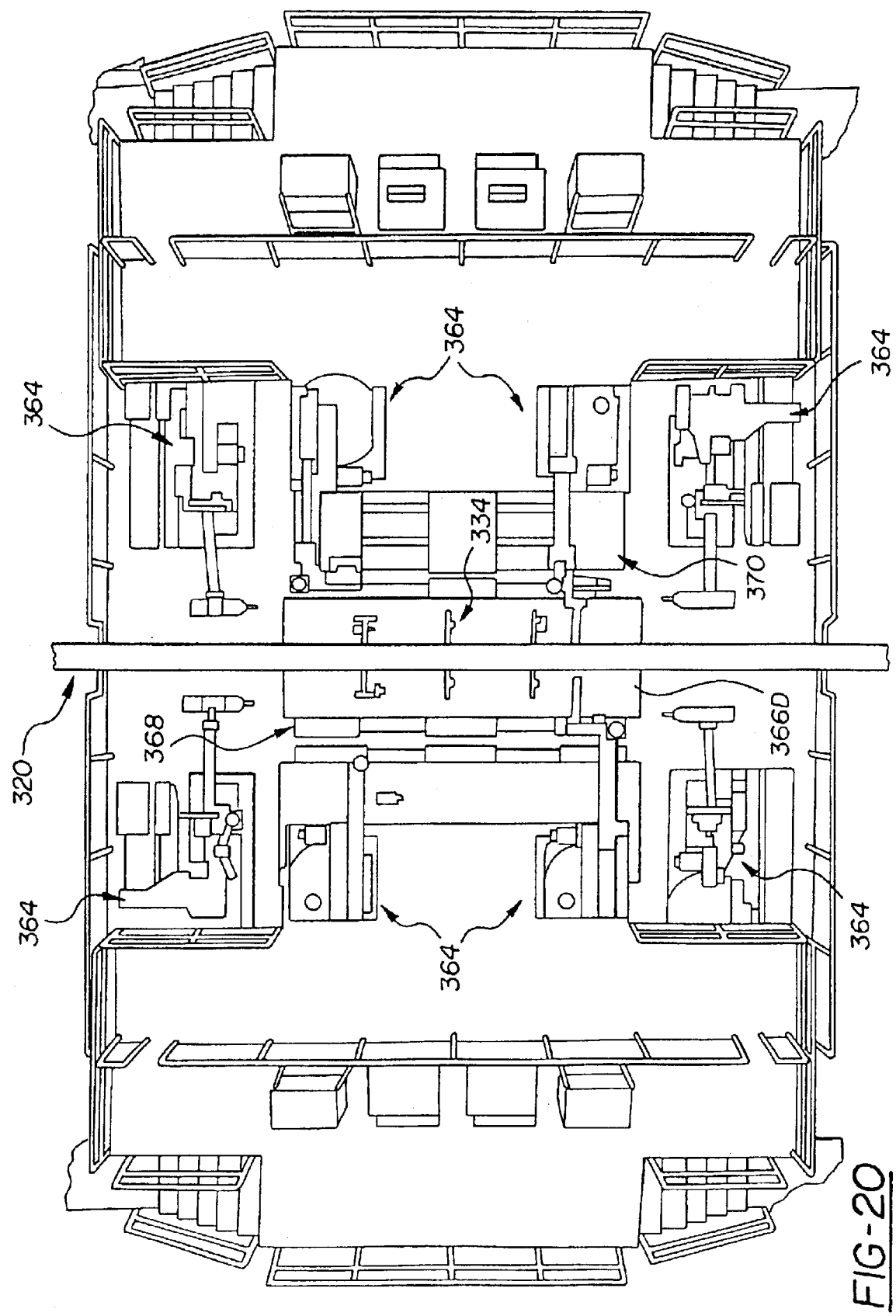
FIG. 20 is a plan view of the flexible body assembly workstation illustrated in FIG. 19.

Referring now to FIGS. 19–20, a flexible body assembly workstation is illustrated in detail. This workstation can be one of a plurality along a single overhead transport system 308, 310, 312, for assembly of the left hand bodyside, right hand bodyside or underbody assembly lines 302, 304, 306 respectively. Various modifications can be made to the flexible body assembly workstation without departing from the disclosure of the present invention. By way of example and not limitation, the number, type, and location of the automated robots can be changed and modified as required for the particular workstation depending on the work to be performed. By way of example and not limitation, the flexible body assembly workstation can perform the function of a geometry workstation, a respot workstation, a loading or unloading station, a sealer station, a stud welding workstation, a MIG welding workstation, and a product inspection workstation. The flexible body assembly workstation 362 preferably includes one or more robots 364 positioned on either an overhead gantry or platform and/or at floor level, as required for the particular function to be performed at the workstation 362. The flexible body assembly workstation 362 also includes an overhead electric monorail system 320 extending through the workstation for delivering parts, or partially assembled components for further assembly at the workstation. As previously described, the electric monorail system 320 includes an overhead rail 322 supporting a trolley or workpiece carrier 350 by first and second carriages 324, 326 connected to the overhead rail 322. Vertically extending supports or pillars 328 extend downwardly from each carriage 324, 326 to support a horizontal support member 330 there between. A workpiece support or antler nest 334 is operably engaged with the horizontal support member 330. A single drive mechanism 332 is provided for each vertically extending support or pillar 328 to engage and unlock the horizontal support member 330 from the vertically extending supports or pillars 328 prior to being lowered into a lowered position to transfer the workpiece or component from the antler nest 334 to a geometry fixture, sometimes referred to herein as a tooling fixture or workpiece support, located at the flexible body assembly workstation 362. The flexible body assembly workstation 362 includes workpiece support or geometry fixtures corresponding to the number of different automotive body styles and/or models to be produced through the assembly line. Workpiece supports or geometry fixtures 366*a*, 366*b*, 366*c*, 366*d* are illustrated to correspond to each of four automotive body styles and/or models respectively to be built through the flexible body assembly workstation 362. The workpiece support or geometry fixtures can be moved relative to the flexible body assembly workstation 362 in order to bring the appropriate workpiece support or geometry fixture into position to receive the carried workpiece or a component from the trolley 350. Providing a single geometry fixture at each workstation for the particular body style or model to be assembled eliminates variation between the geometry of successively assembled parts passing through the workstation, as is commonly experienced with systems based on a pallet delivery configuration. Consistency between the component parts is desirable to achieve the quality standards and tolerances required by automotive manufacturers. Since each workpiece or component is placed into the same geometry fixture corresponding to the same body style or model to be assembled, consistent part production and improved tolerance specifications can be met with the present invention. As the horizontal support member 330 of the trolley 350 is lowered into the lower position, the supported workpiece or component is transferred from the workpiece support or antler nest 334 to the corresponding geometry fixture, such as 366*a*, corresponding to the style or model to be assembled. The workpiece support geometry fixtures 366*a*, 366*b*, 366*c*, 366*d*, are moveable along a predetermined path to change the geometry fixtures as required for the product mix being assembled through the workstation 362. By way of example and not limitation, the geometry fixtures can be supported on a roller conveyor for movement along a predetermined horizontal path to locate any one of the geometry fixtures in the operable position or ready position below the overhead rail 322 for receiving the next delivered workpiece or component by the trolley 350 entering the flexible body assembly workstation 362. The geometry fixture handling system 368, such as roller conveyor 370 can exchange the furthest apart geometry fixtures, by way of example and not limitation 366a and 366d with each other within the cycle time permitted for the removal of a finished workpiece or component from the workstation 362 and the delivery of the next workpiece or component to the flexible body assembly workstation 362.

Figure 21:
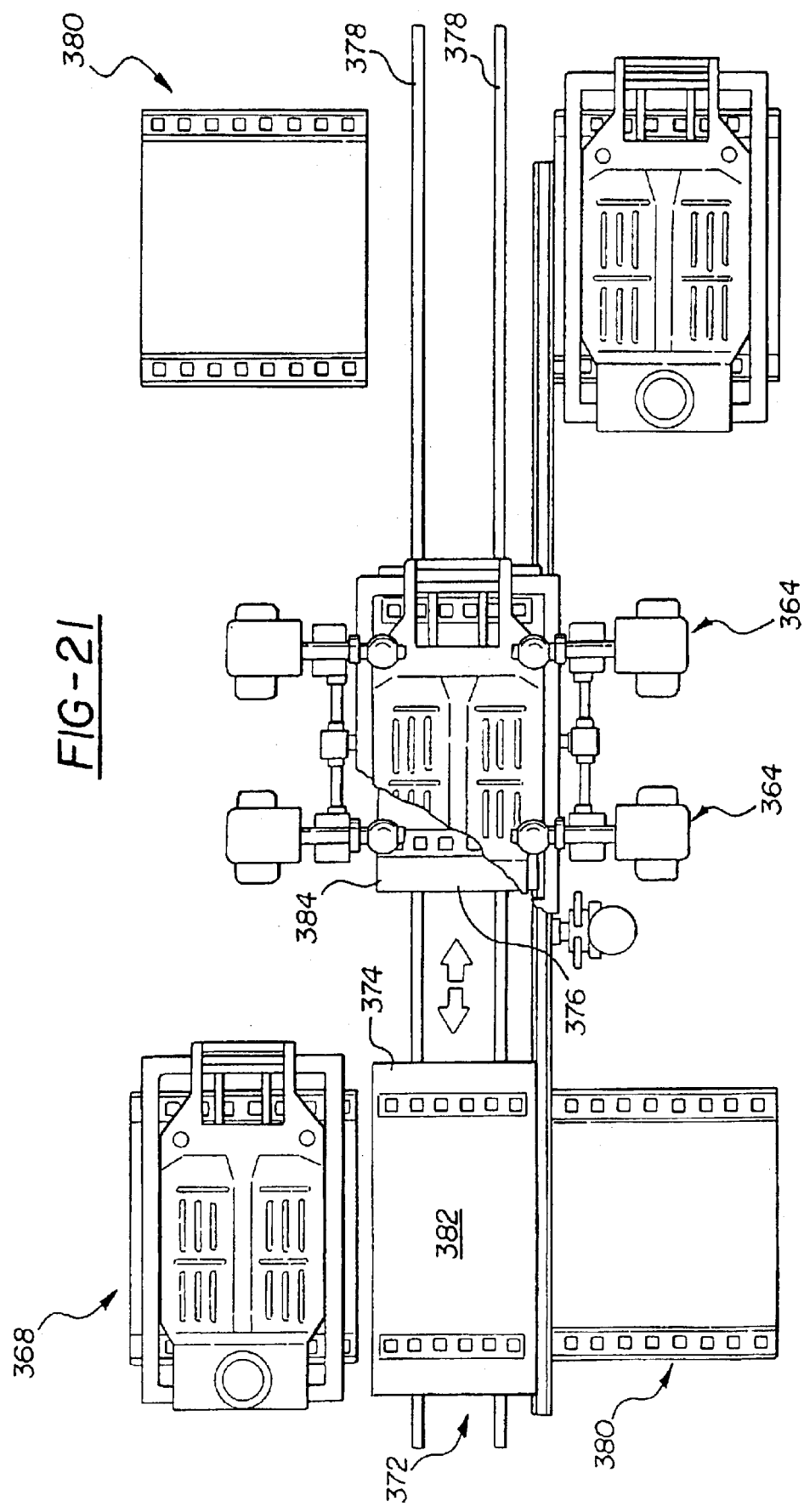
FIG. 21 is a plan view of an "H-Gate" workpiece support or geometry fixture configuration as an alternative for supplying the appropriate workpiece support to the flexible body assembly workstation as required for the particular body style or model to be manufactured.
Figure 22:
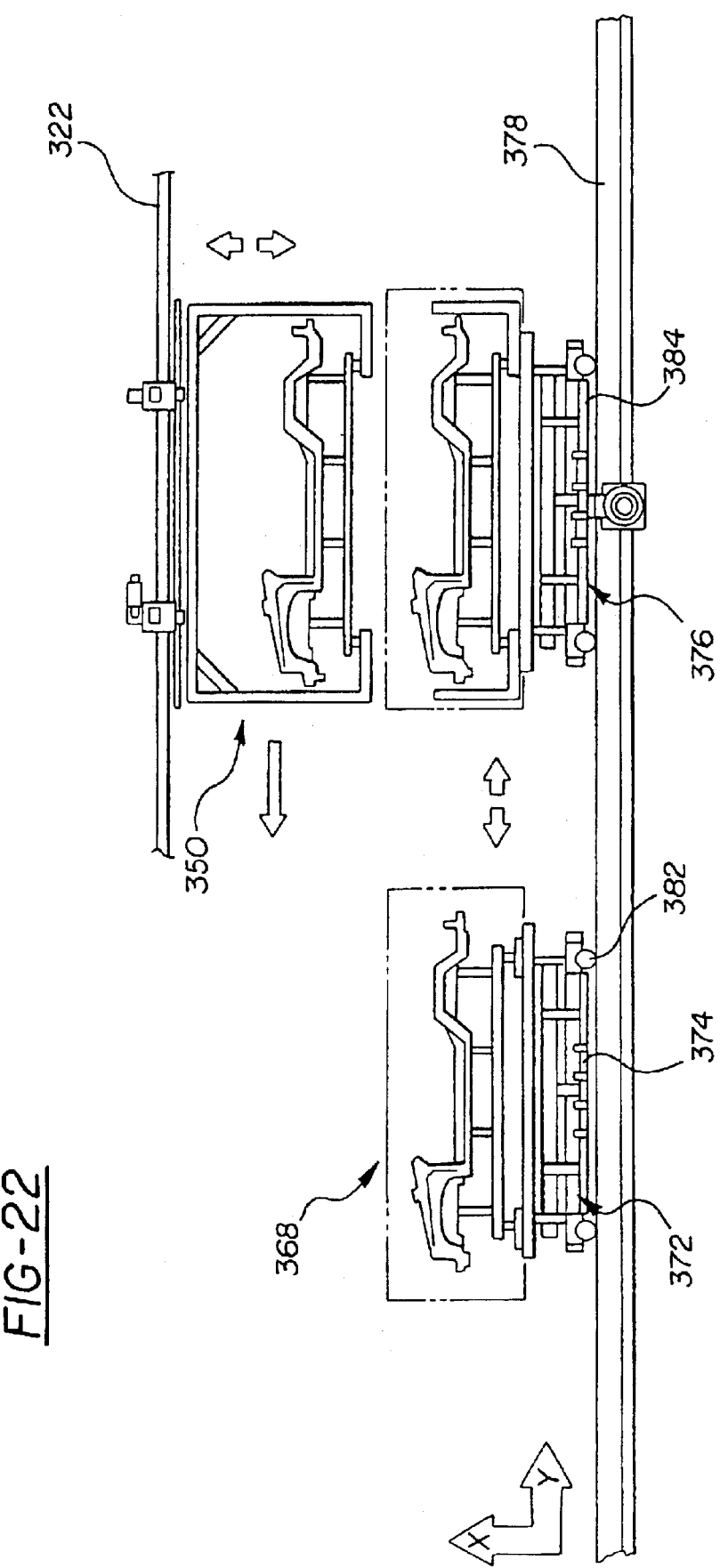
FIG. 22 is a side elevational view of the H-Gate delivery system illustrated in FIG. 21.
Figure 23:
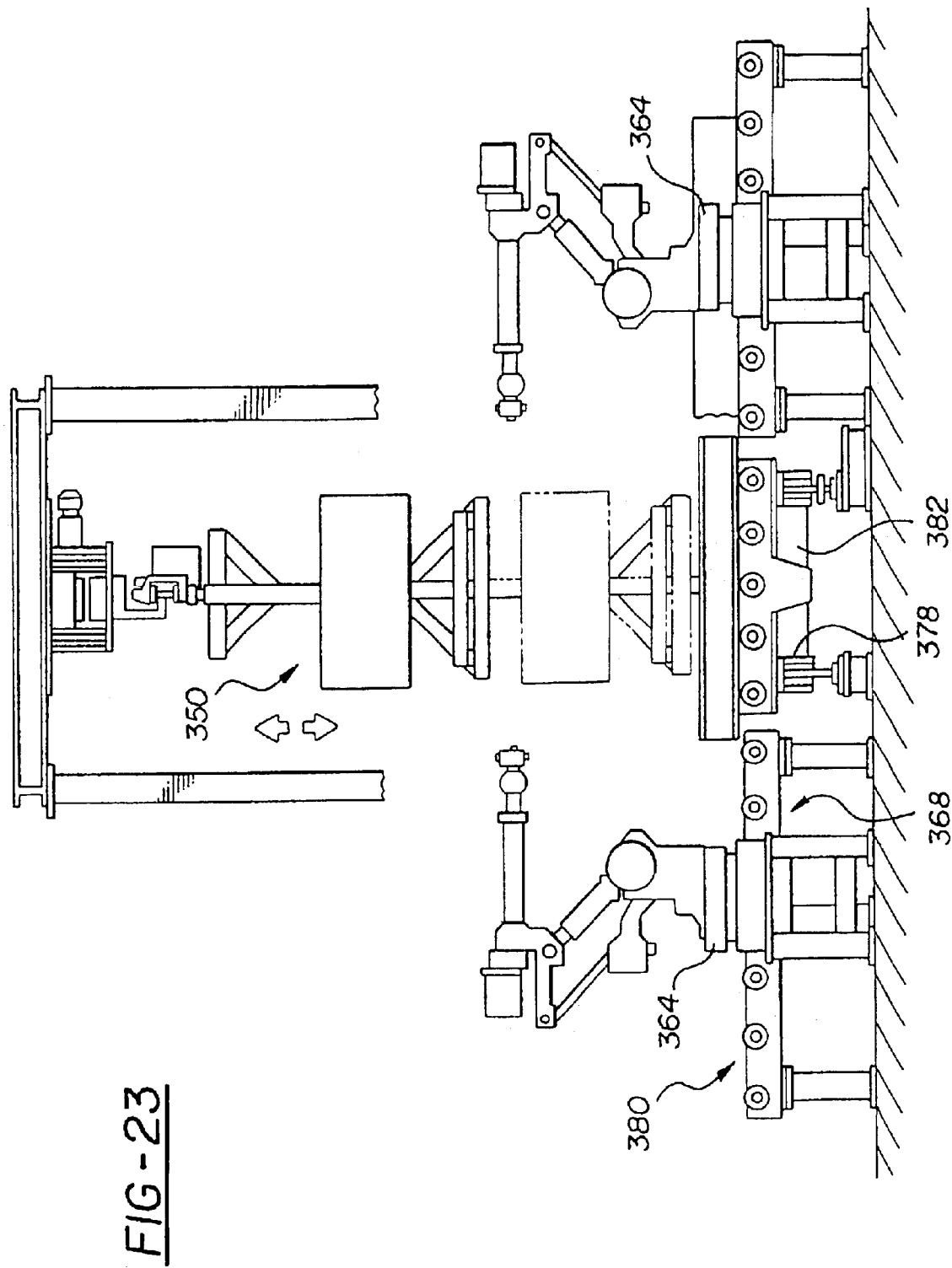
FIG. 23 is a simplified H-Gate cross section illustrating the overhead delivery system and the H-Gate delivery system to the flexible body assembly workstation.

An alternative geometry fixture handling system 368 is illustrated in FIGS. 21, 22 and 23. An "H-Gate" configuration is illustrated in FIGS. 21-23. In this configuration, a rail shuttle system 372 is provided passing through the center line of the flexible body workstation 362 in order to move a geometry fixture 366a from the operable position or ready position to a standby position 374 on either side of the operable position 376 along the rails 378. On either side of the workstation 362, transversely extending fixture delivery systems 380 extend on either side of the rails 378. This configuration gives the fixture delivery handling system 368 its distinctive "H" moniker. The fixture delivery conveyors 380 can include one or more geometry fixtures 366a, 366b, 366c for delivery to the operable position 376. The H-Gate system delivers a new geometry fixture 366a to the standby position 374. After work has been completed on the workpiece at the flexible body assembly workstation 362 in the operable position 376, and the workpiece has been lifted from the geometry fixture 366b, the shuttles 382, 384 are reciprocated along the rails 378 to move the previously used geometry fixture 366b from the operable position 376 to a standby position 374, while the geometry fixture 366a is moved from the standby position on the opposite side of the workstation 362 to the operable position 376. The previously used geometry fixture 366b can then be removed from the shuttle while at the standby position 374. As illustrated in FIG. 22, the overhead transport system 320 can deliver the workpiece or a component to the geometry fixture located at the operable position 376, while the next to be used geometry fixture is positioned at the standby position 374. When required, the shuttles can be reciprocated along the rails 378 to move the previously used geometry fixture from the operable position 376 while being replaced with the new geometry fixture from the standby position 374.

Referring now to FIG. 23, the overhead transport system is illustrated for lowering a part or component onto the geometry fixture waiting at the operable position 376. One or more automated robots 356 are provided for performing assembly work on the part or component delivered to the operable position 376. The fixture delivery conveyors 380 can be seen for moving the geometry fixtures to and from the standby position on either side of the flexible body assembly workstation 362.

Figure 24B:
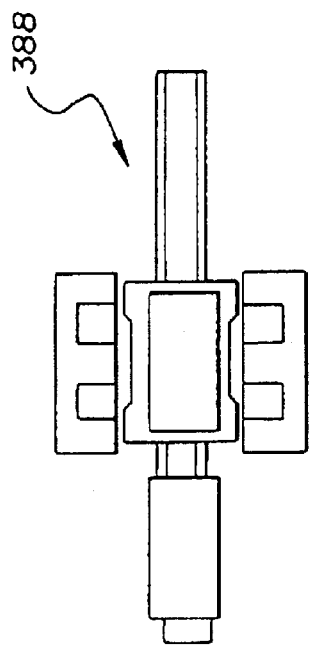
FIGS. 24A–24D illustrates alternative configurations for the H-Gate delivery system for the workpiece support or geometry fixture tooling to the flexible body assembly workstation according to the present invention allowing flexible set up between one model, two models, three models, and four models through the same flexible body assembly workstations.
Figure 24D:
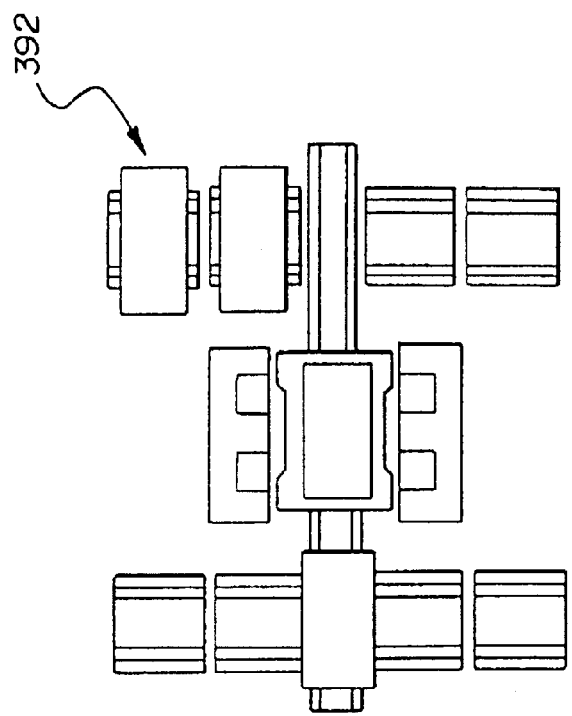
Figure 24A:
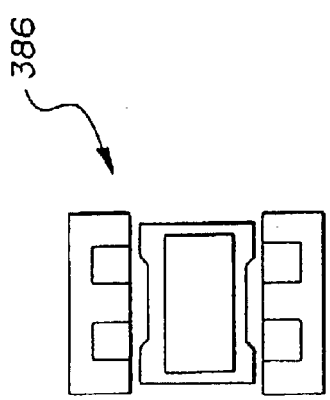
Figure 24C:
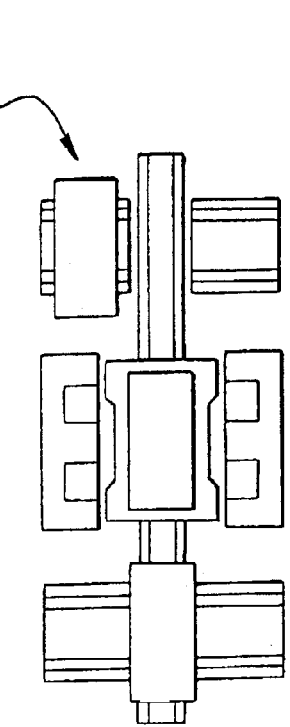

Referring now to FIGS. 24A–24D, alternative configurations for the H-Gate geometry fixture delivery system are provided illustrating a single geometry fixture configuration 386 in FIG. 24A, a dual geometry fixture handling system or H-Gate 388 in FIG. 24B, a triple geometry fixture handling system or H-Gate 390 in FIG. 24C, and a quadruple geometry handling system or H-Gate 392 in FIG. 24D. This configuration is extremely flexible for providing flexible body assembly workstations capable of handling single automotive body styles or models, dual automotive body styles or models, three different automotive body styles or models, and up to four different automotive body styles or models.

Using either geometry fixture handling system 368, the flexible body assembly workstation 362 according to the present invention provides a single geometry fixture for each automotive body style or model to be manufactured through the workstation. This increases the reliability, repeatability, and manufacturing tolerances capable of being achieved through the flexible body assembly workstation 362. The flexible body assembly workstation 362 also increases manufacturing efficiency, by allowing a product mix to be handled through the assembly line without down time for retooling.

Figure 25:
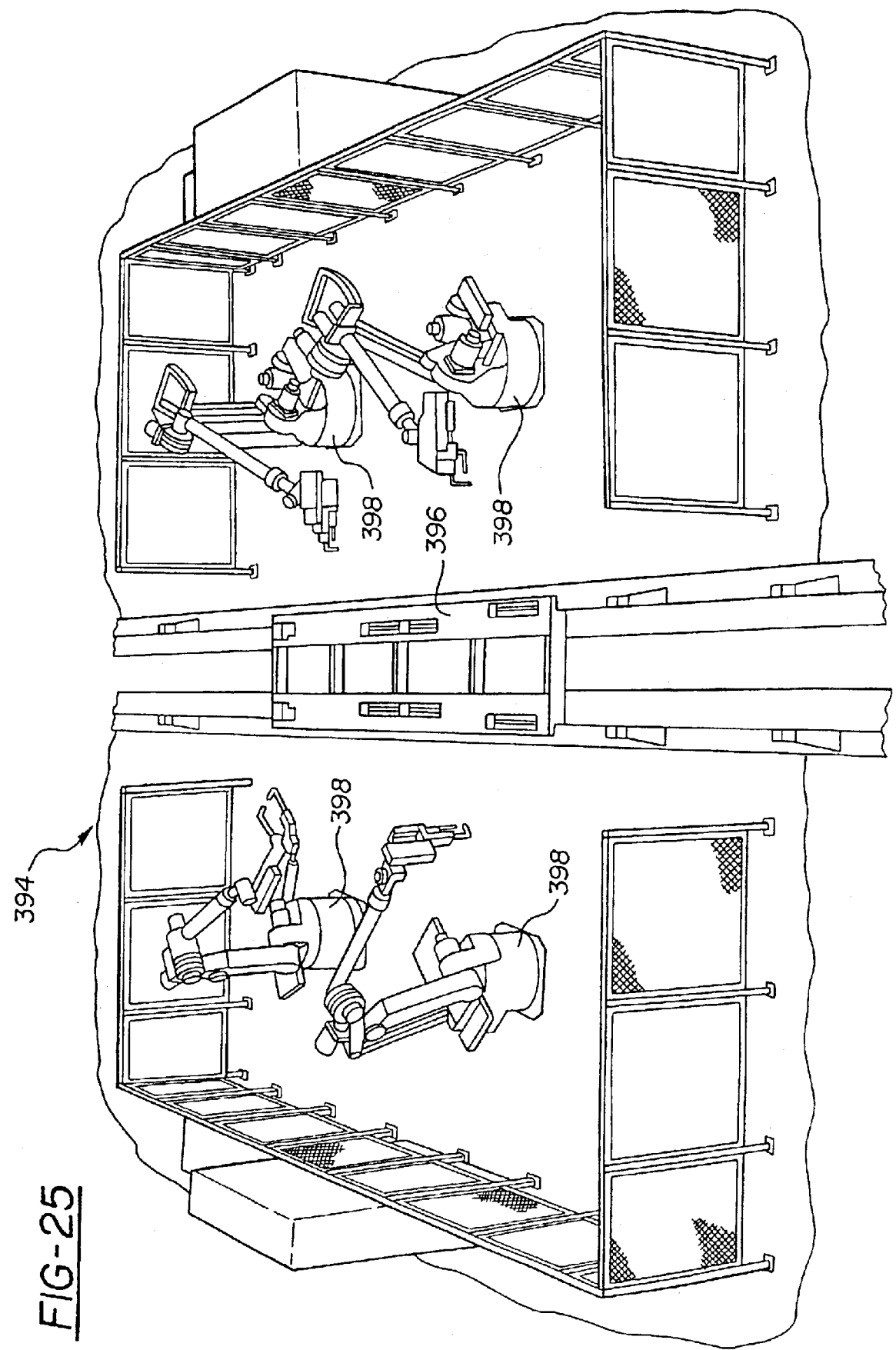
FIG. 25 is a perspective view of a palletized system for delivery of the underbody to the respot workstation and on to the framing workstation, framing respot workstation, closure workstation, and paint workstation.

Referring now to FIG. 25, the present invention includes the transfer of the underbody assembly from the overhead transfer system 312 to a palletized system 394, such as that shown in FIG. 25. The palletized system provides a pallet that receives the workpiece or components to be assembled and the pallet remains with the workpieces as the workpiece travels along the rail system through the underbody respot workstation, framing workstation, framing respot workstation, closure workstation, and painting workstation. The underbody respot workstation can include a plurality of robots 398 for welding areas inaccessible during the tacking at the underbody tack workstation. Additional details regarding the framing workstations can be obtained from International Publication Number WO 99/24215 published on May 20, 1999 which is incorporated by reference herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for transporting a selectable one of a plurality of automobile body configurations comprising:

an overhead transport system including a plurality of trolleys for movement along a predetermined path of travel defined by at least one overhead rail extending between a plurality of workstations in a closed loop configuration;

at least one carriage for each trolley connected to the at least one overhead rail for moving the trolley along the path of travel defined by the at least one overhead rail;

at least one downwardly extending pillar from each carriage;

a horizontal support member connected to the at least one support pillar for movement between a raised position and a lowered position;

a latch for connecting the horizontal support member to the at least one support pillar when in the raised position; and means for transferring automotive components between the overhead transport system and a geometry fixture at a ready position of at least one workstation along the closed loop path of travel, the geometry fixture supporting an automotive component for a processing operation such that each automotive component of an identical configuration is supported by the same geometry fixture at the at least one workstation during the processing operation.

2. The apparatus of claim 1 further comprising:

means for selectively supporting a plurality of automotive body styles from the overhead transport system for transport along the closed loop path of travel in any sequential order.

3. The apparatus of claim 1 further comprising:

means for controlling the transferring means in response to a signal indicating the carriage is in a raised and locked position.

4. The apparatus of claim 1 further comprising:
means for loading an individual automotive component on an antler nest engaged with the carriage.

5. The apparatus of claim 1 further comprising:
means for controlling the trolley in response to a signal indicating a position of the carriage.

6. The apparatus of claim 1 further comprising:
the horizontal support member enclosing at least a portion of the latch and supporting the latch for pivoting movement between an engaged position and a released position.

7. The apparatus of claim 1 further comprising:
at least one sensor supported by the downwardly extending pillar for sensing if the horizontal support member is in the raised position.

8. An apparatus for transporting a selectable one of a plurality of automobile body configurations comprising:
an overhead transport system including a plurality of trolleys for movement along a predetermined path of travel defined by at least one overhead rail extending between a plurality of workstations in a closed loop configuration;
at least one carriage for each trolley connected to the at least one overhead rail for moving the trolley along the path of travel defined by the at least one overhead rail;
at least one downwardly extending pillar from each carriage;
a horizontal support member connected to the at least one support pillar for movement between a raised position and a lowered position;
a latch for connecting the horizontal support member to the at least one support pillar when in the raised position; and
at least one locating pin mounted on the horizontal support for locking engagement with an interchangeable component nest to hold the interchangeable component nest with respect to the horizontal support member.

9. An apparatus for transporting a selectable one of a plurality of automobile body configurations comprising:
an overhead transport system including a plurality of trolleys for movement alone a predetermined path of travel defined by at least one overhead rail extending between a plurality of workstations in a closed loop configuration;
at least one carriage for each trolley connected to the at least one overhead rail for moving the trolley alone the path of travel defined by the at least one overhead rail;
at least one downwardly extending pillar from each carriage;
a horizontal support member connected to the at least one support pillar for movement between a raised position and a lowered position;
a latch for connecting the horizontal support member to the at least one support pillar when in the raised position; and
means for selectively supporting a plurality of automotive body styles from the overhead transport system for transport along the closed loop path of travel in any sequential order, wherein the supporting means includes a plurality of antler nests, each nest individually engageable with the horizontal support member for supporting at least one of a plurality of automotive components corresponding to a plurality of different automotive body styles to be processed on the closed loop path of travel, at least one antler nest for each different body style to be transported along the closed loop path of travel.

10. The apparatus of claim 9 further comprising:
means for exchanging one antler nest engaged with the carriage with another antler nest to be engaged with the carriage.

11. The apparatus of claim 10 further comprising:
means for controlling the exchanging means in response to a signal corresponding to the next component configuration to be loaded on the carriage.

12. An apparatus for transporting a selectable one of a plurality of automobile body configurations comprising:
an overhead transport system including a plurality of trolleys for movement along a predetermined path of travel defined by at least one overhead rail extending between a plurality of workstations in a closed loop configuration;
at least one carriage for each trolley connected to the at least one overhead rail for moving the trolley along the path of travel defined by the at least one overhead rail;
at least one downwardly extending pillar from each carriage;
a horizontal support member connected to the at least one support pillar for movement between a raised position and a lowered position;
a latch for connecting the horizontal support member to the at least one support pillar when in the raised position; and
means for selectively positioning one of a plurality of geometry fixtures in a ready position of the at least one workstation on the closed loop path of travel, at least one geometry fixture corresponding to each automotive body style to be assembled on the closed loop path of travel.

13. The apparatus of claim 12 further comprising:
means for controlling the positioning means in response to a signal corresponding to a next automotive body style to be delivered to the workstation.

14. The apparatus of claim 12, wherein the positioning means is operable to remove a first geometry fixture from the ready position and locate a second geometry fixture in the ready position during a time period corresponding to a cycle of removing a first component from the first geometry fixture and delivering a second component to the at least one workstation such that a plurality of different automotive body styles can be assembled in concurrent sequential order on the closed loop path of travel.

15. The apparatus of claim 12 further comprising:
means for loading an individual automotive component on an antler nest engaged with the carriage.

16. The apparatus of claim 12 further comprising:
means for controlling the trolley in response to a signal indicating a position of the carriage.

17. The apparatus of claim 12 further comprising:
at least one sensor supported by the downwardly extending pillar for sensing if the horizontal support member is in the raised position.

18. An apparatus for transporting a selectable one of a plurality of automobile body configurations comprising:
an overhead transport system including a plurality of trolleys for movement along a predetermined path of travel defined by at least one overhead rail extending between a plurality of workstations in a closed loop configuration, the closed loop path of travel having a maximum overall rate of production capacity while running;

at least one carriage for each trolley connected to the at least one overhead rail for moving the trolley alone the path of travel defined by the at least one overhead rail;

at least one downwardly extending pillar from each carriage;

a horizontal support member connected to the at least one support pillar for movement between a raised position and a lowered position;

a latch for connecting the horizontal support member to the at least one support pillar when in the raised position; and positioning means for exchanging one geometry fixture at the workstation for another geometry fixture based on the next component to be delivered to the at least one workstation on the closed loop path of travel, while maintaining the maximum overall rate of production capacity of the closed loop path of travel.

19. An apparatus comprising:

an overhead transport system including a plurality of trolleys for movement alone a predetermined path of travel defined by at least one overhead rail extending between a plurality of workstations in a closed loop configuration;

at least one carriage for each trolley connected to the at least one overhead rail for moving the trolley along the path of travel defined by the at least one overhead rail;

at least one downwardly extending pillar from each carriage;

a horizontal support member connected to the at least one support pillar for movement between a raised position and a lowered position;

a latch for connecting the horizontal support member to the at least one support pillar when in the raised position, the horizontal support member enclosing at least a portion of the latch and supporting the latch for pivoting movement between an engaged position and a released position; and a latch release actuator located at a workstation, the latch release actuator separate from the carriage for operably engaging the latch only when the carriage is located at the workstation for moving the latch between the engaged position and the released position.

20. The apparatus of claim 19 further comprising:

at least one sensor supported by the horizontal support member for sensing if the latch is in the released position.

* * * * *